(12) United States Patent
Kunii et al.

(10) Patent No.: US 11,232,222 B2
(45) Date of Patent: Jan. 25, 2022

(54) ACCESS MANAGEMENT SYSTEM, ACCESS MANAGEMENT METHOD AND PROGRAM

(71) Applicant: ZENMUTECH, INC, Tokyo (JP)

(72) Inventors: Atsushi Kunii, Tokyo (JP); Kiyoshi Tomomura, Tokyo (JP)

(73) Assignee: ZENMUTECH, INC, Tokyo (JP)

( * ) Notice: Subject to any disclaimer, the term of this patent is extended or adjusted under 35 U.S.C. 154(b) by 216 days.

(21) Appl. No.: 16/473,622

(22) PCT Filed: Dec. 26, 2017

(86) PCT No.: PCT/JP2017/046732
§ 371 (c)(1),
(2) Date: Jun. 26, 2019

(87) PCT Pub. No.: WO2018/124105
PCT Pub. Date: Jul. 5, 2018

(65) Prior Publication Data
US 2019/0332792 A1    Oct. 31, 2019

(30) Foreign Application Priority Data

Dec. 27, 2016    (JP) .............................. JP2016-252820

(51) Int. Cl.
*G06F 21/62*    (2013.01)
*G06F 21/60*    (2013.01)
*H04L 9/08*    (2006.01)

(52) U.S. Cl.
CPC ........ *G06F 21/6218* (2013.01); *G06F 21/602* (2013.01); *H04L 9/0861* (2013.01); *H04L 9/0894* (2013.01)

(58) Field of Classification Search
None
See application file for complete search history.

(56) References Cited

U.S. PATENT DOCUMENTS

| 7,865,741 B1 * | 1/2011 | Wood | G06F 21/606 |
| | | | 713/193 |
| 2009/0218401 A1 * | 9/2009 | Moran | G09F 3/10 |
| | | | 235/439 |

(Continued)

OTHER PUBLICATIONS

H. Krawczyk, "Secret Sharing Made Short", Crypto '93 Proceedings of the 13th Annual International Cryptology Conference on Advances in Cryptology, Aug. 22-26, 1993, pp. 136-146, 11pp.

(Continued)

*Primary Examiner* — Brandon S Hoffman
(74) *Attorney, Agent, or Firm* — Hauptman Ham, LLP

(57) ABSTRACT

In an access management system for managing access to data handled on a shared server, the data in a registered folder on the shared server is kept in secret through transform using an access key. A database in the system is configured to store identification information of n shares generated by splitting the access key using threshold secret sharing scheme in association with a data path of a folder assigned to a first user. Some of the shares are retained in the system as system shares and at least one remaining share is provided to the first user as a user share. When an access request is received along with a first user share from the first user, target data recovered using the access key recovered based on a number of shares that satisfies the quorum is deployed to the registered folder.

12 Claims, 13 Drawing Sheets

(56) References Cited

U.S. PATENT DOCUMENTS

| | | | |
|---|---|---|---|
| 2014/0229731 A1* | 8/2014 | O'Hare | G06F 21/6227 |
| | | | 713/165 |
| 2015/0052369 A1* | 2/2015 | Koning | H04L 9/085 |
| | | | 713/193 |
| 2015/0312759 A1* | 10/2015 | Kim | H04W 12/04 |
| | | | 455/411 |

OTHER PUBLICATIONS

R. Rivest, "All-or-Nothing Encryption and The Package Transform", FSE '97 Proceedings of Fast Software Encryption, 1997, pp. 210-218, 9pp.

\* cited by examiner

[Fig.1]
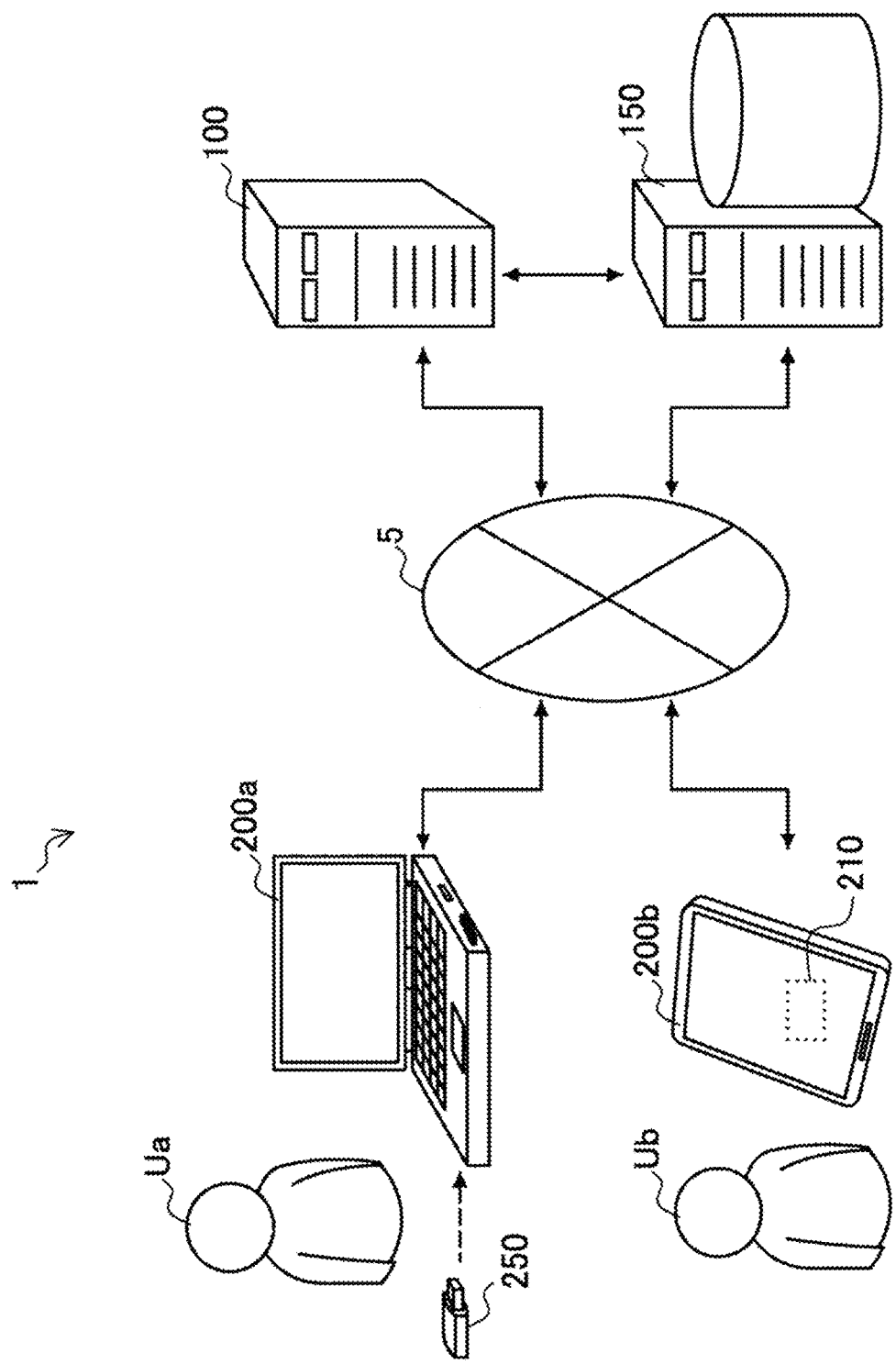

[Fig.2]
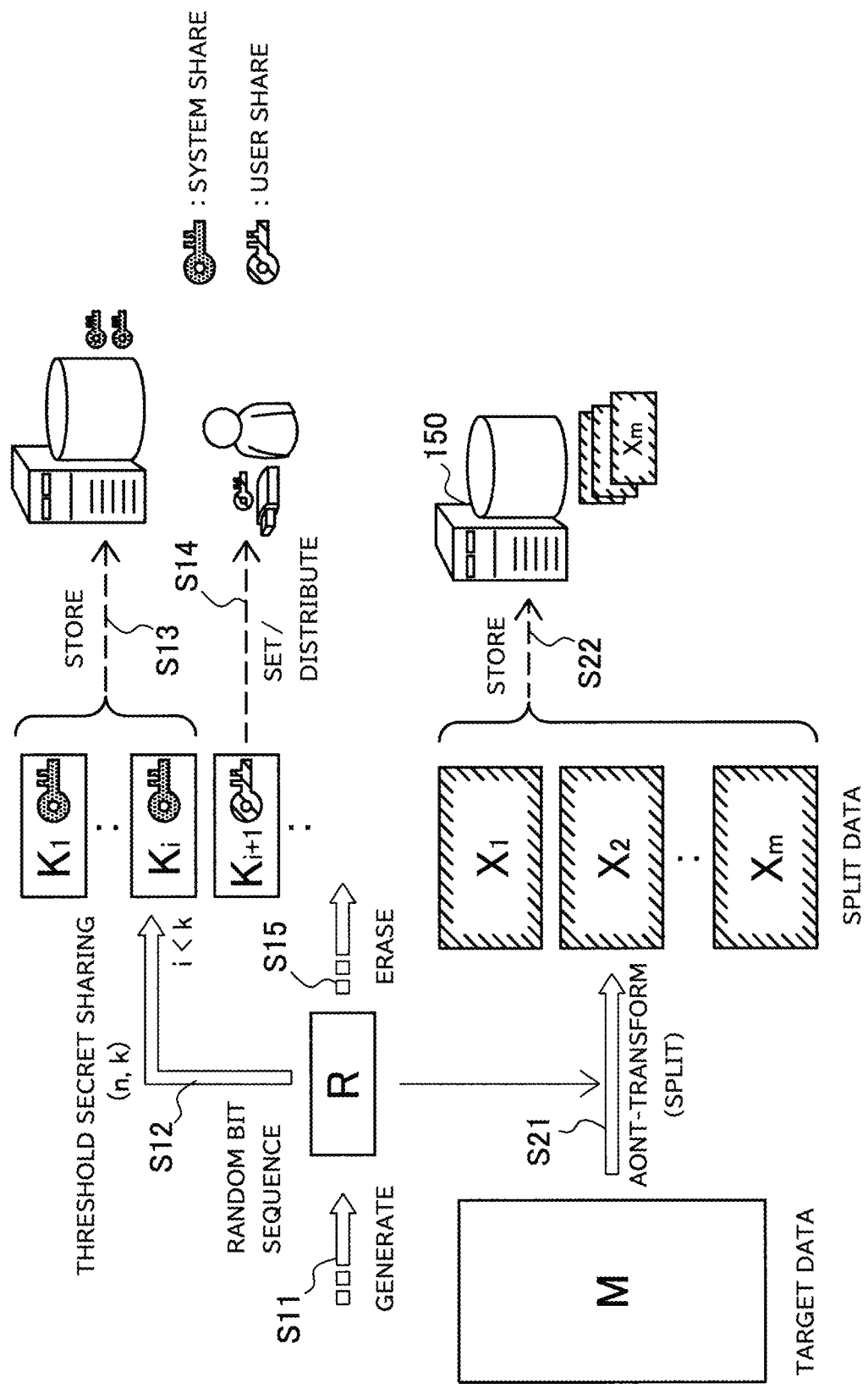

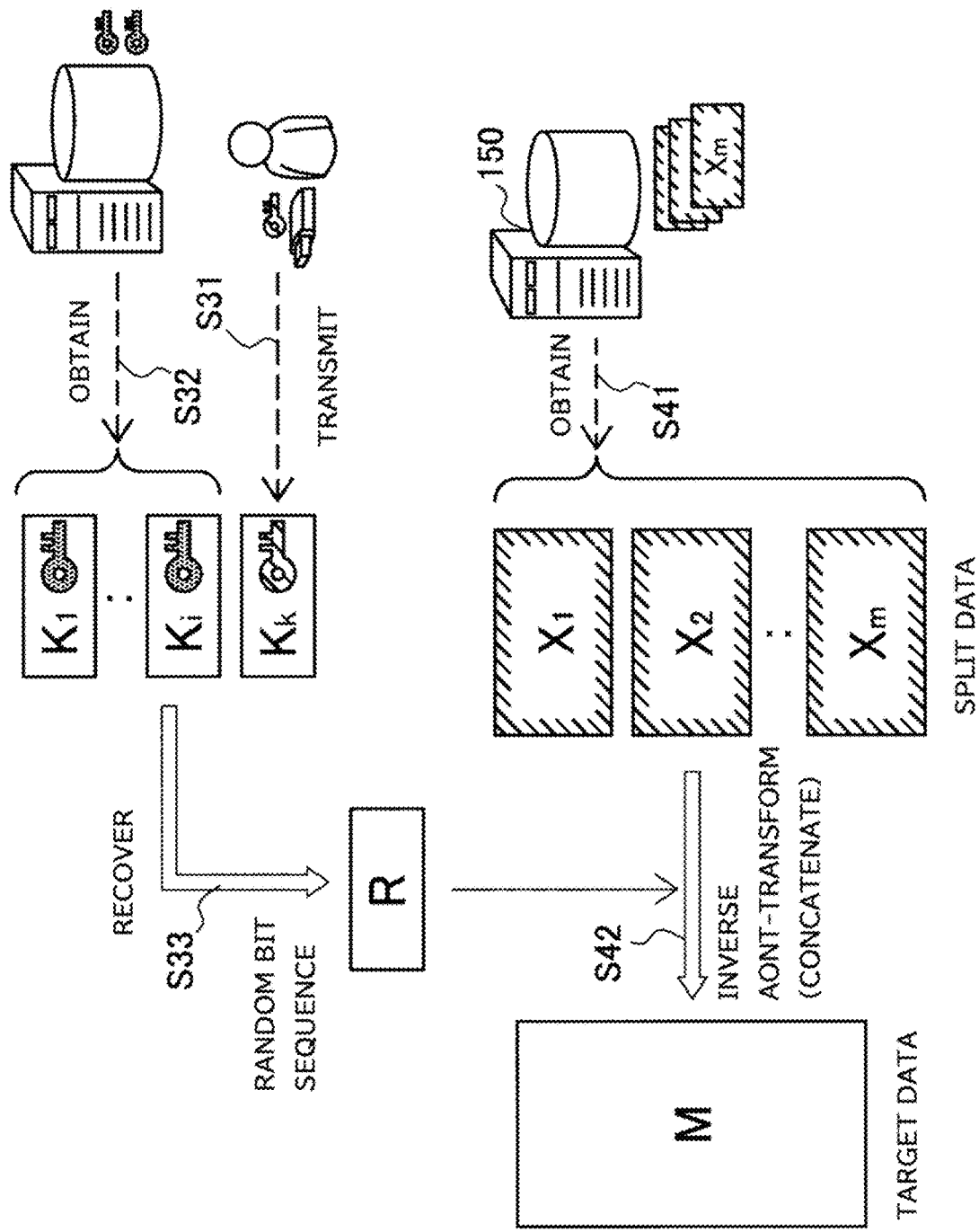

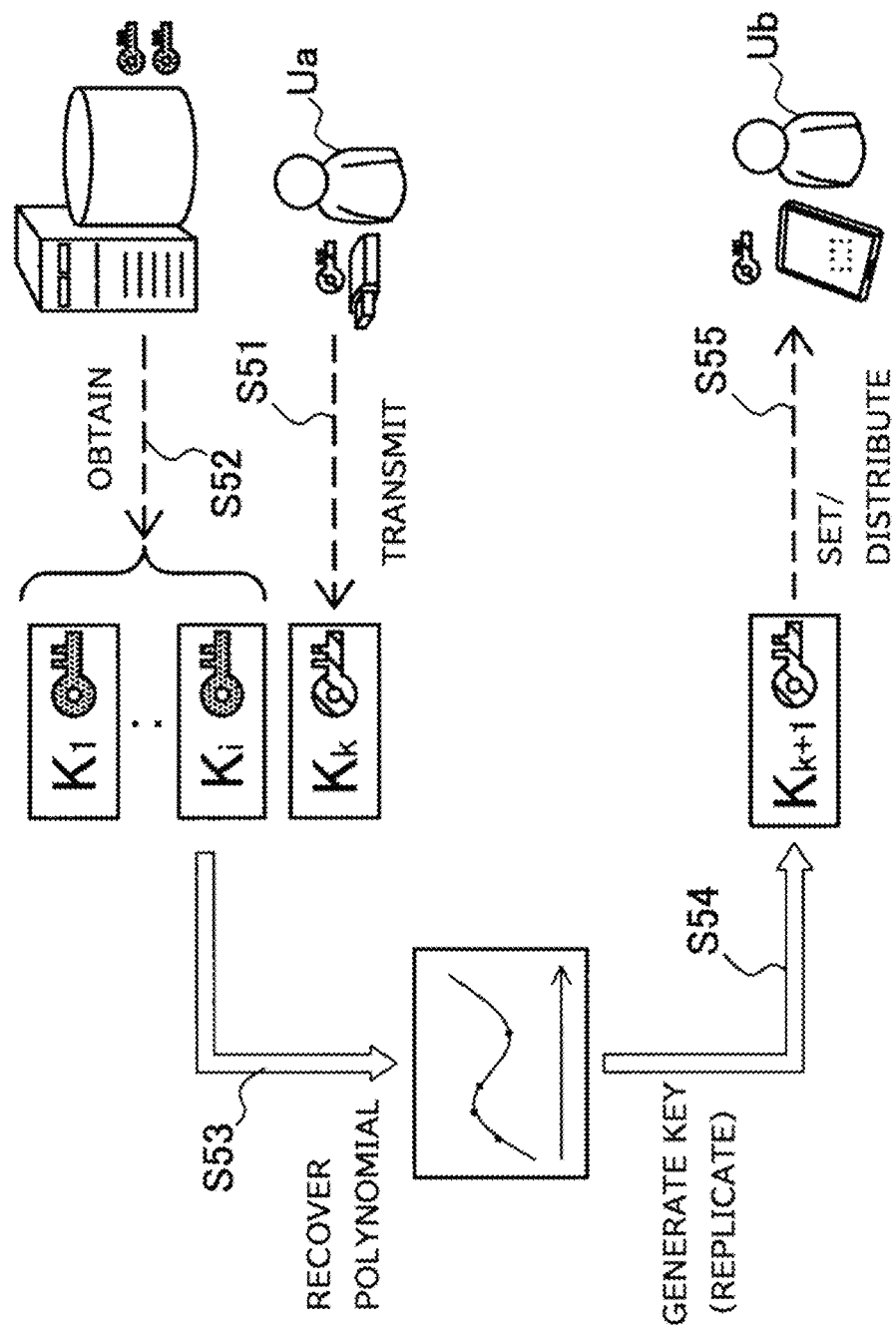

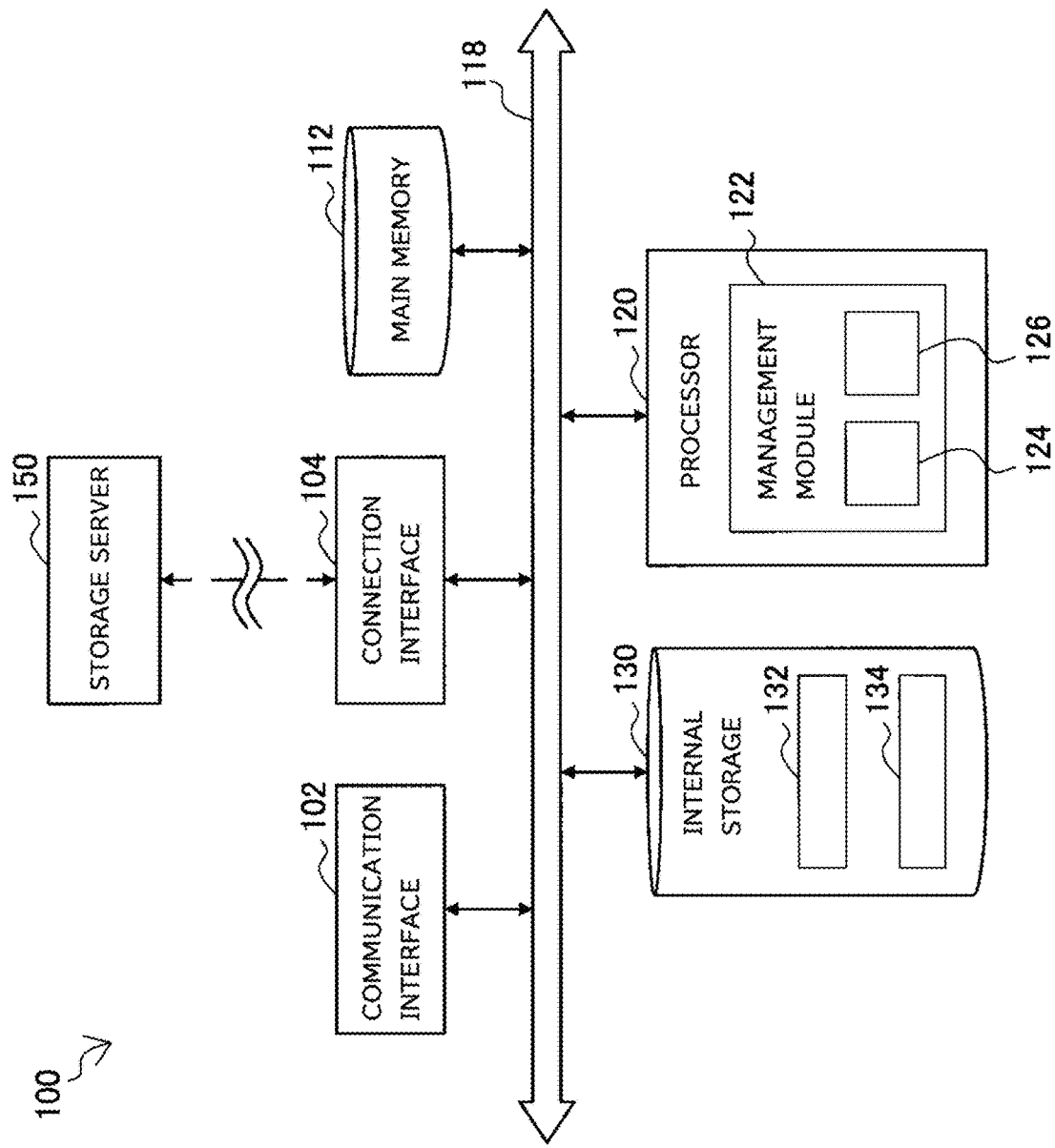
[Fig.5]

[Fig.6]
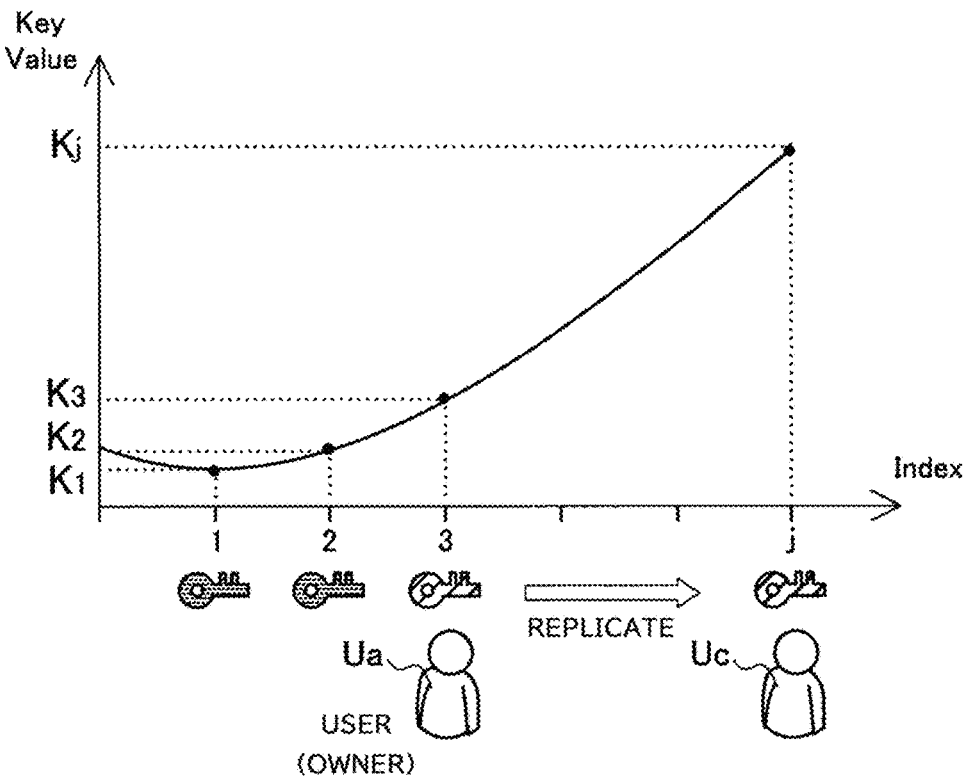
[Fig.7]
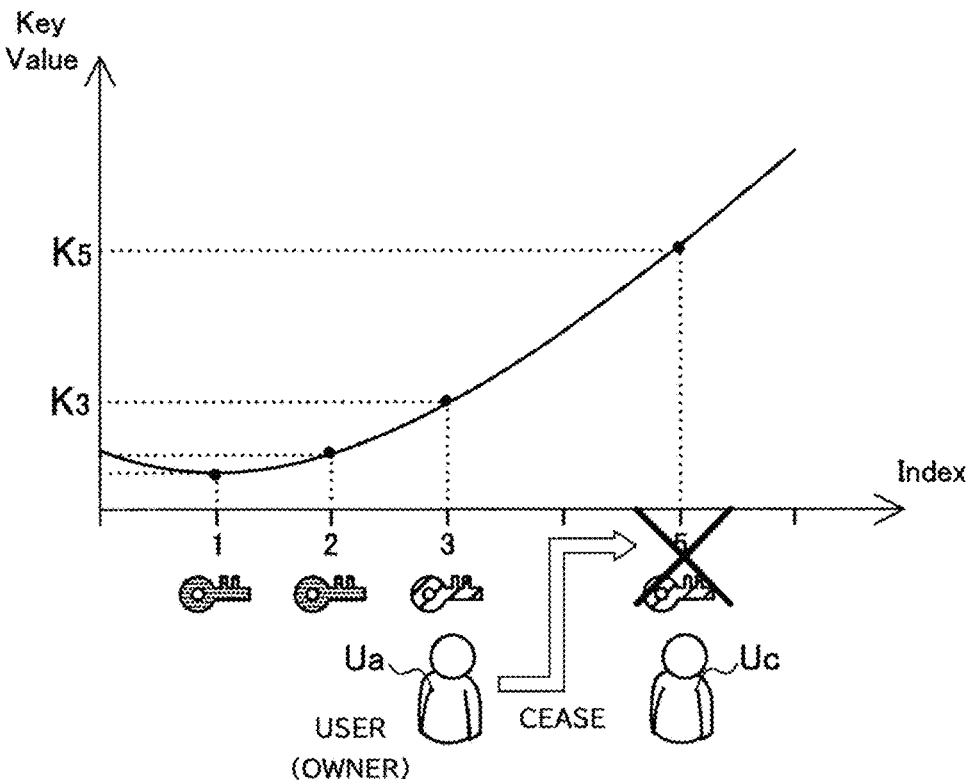

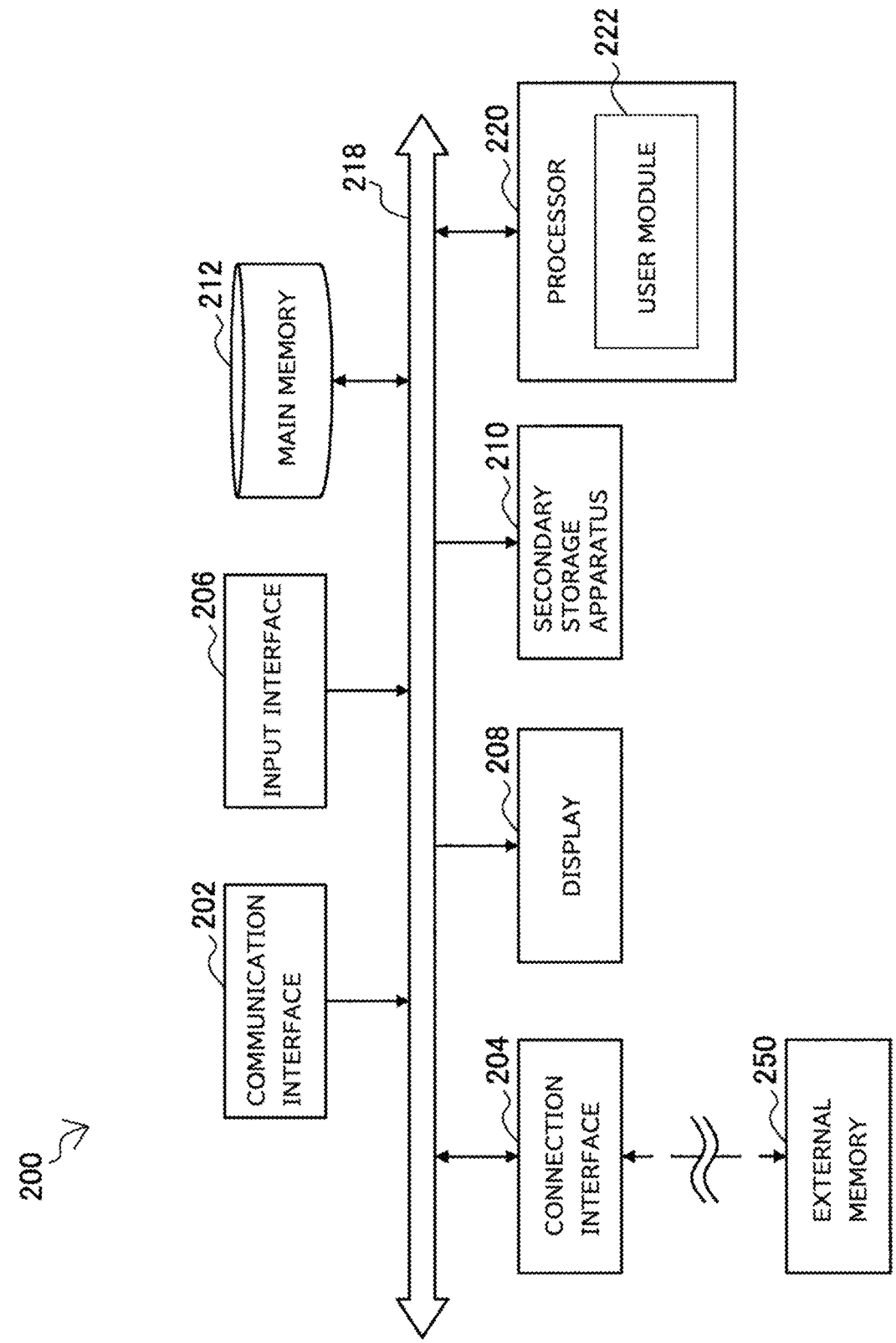
[Fig.8]

[Fig.9]
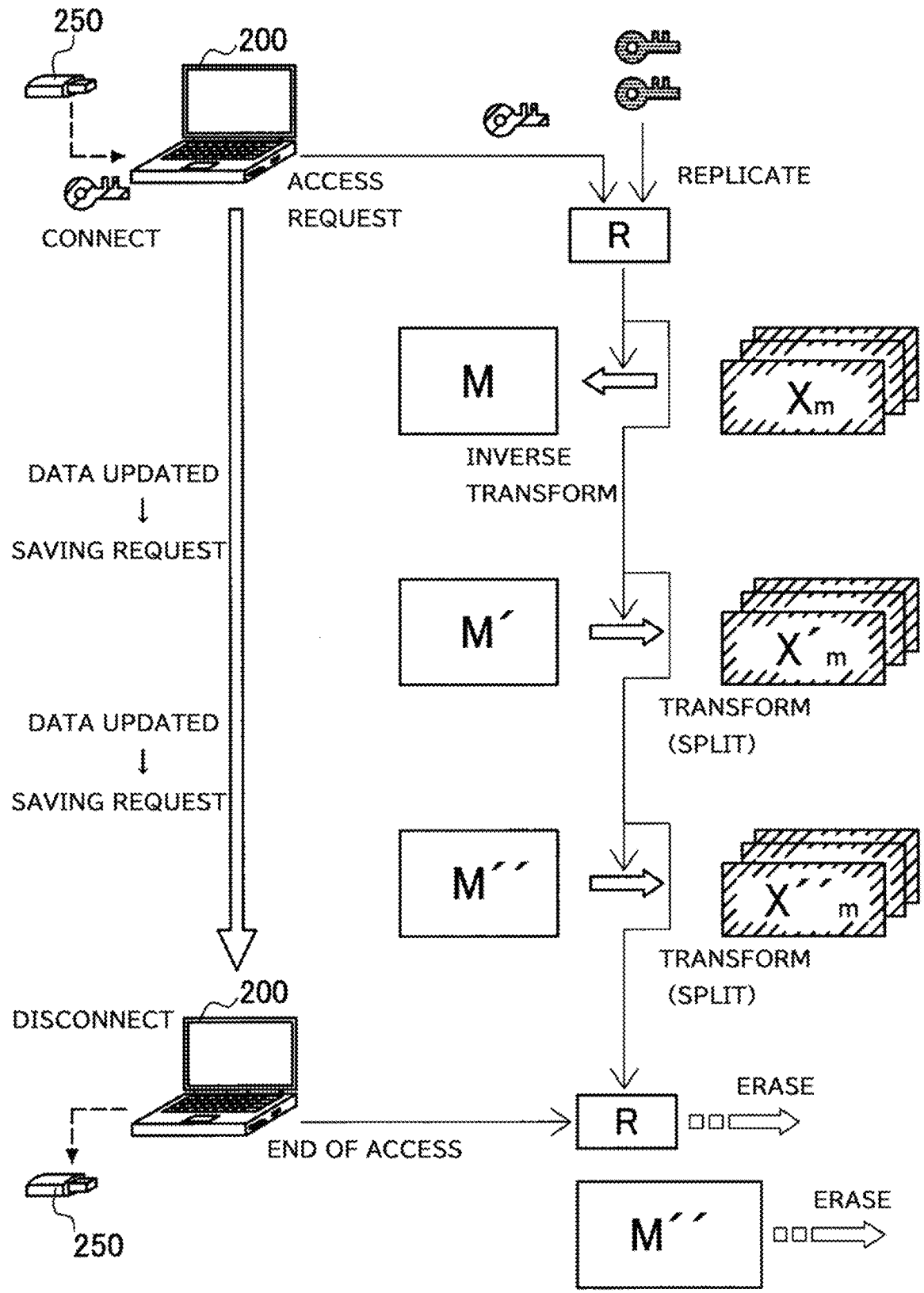

[Fig.10]
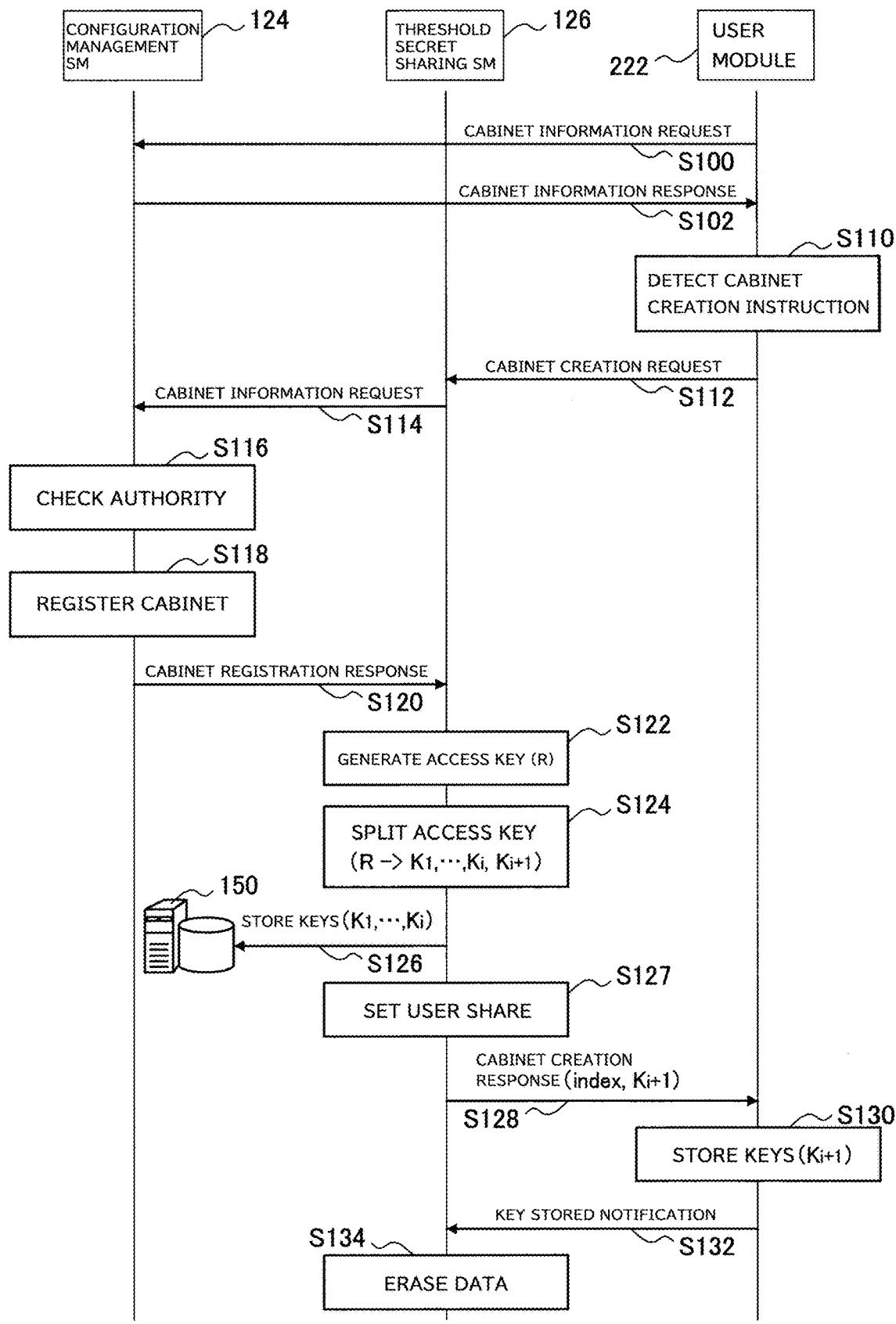

[Fig.11]
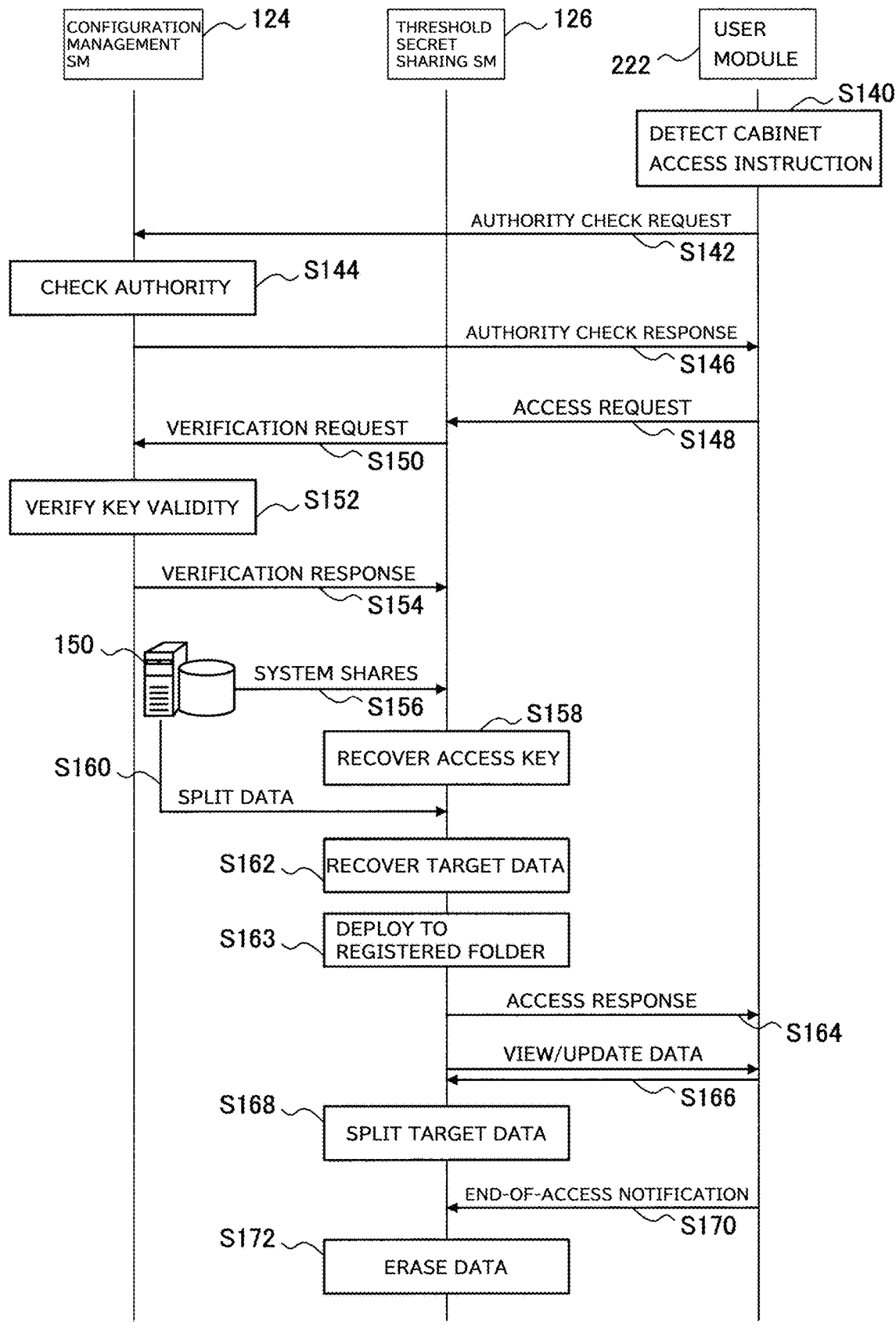

[Fig.12]
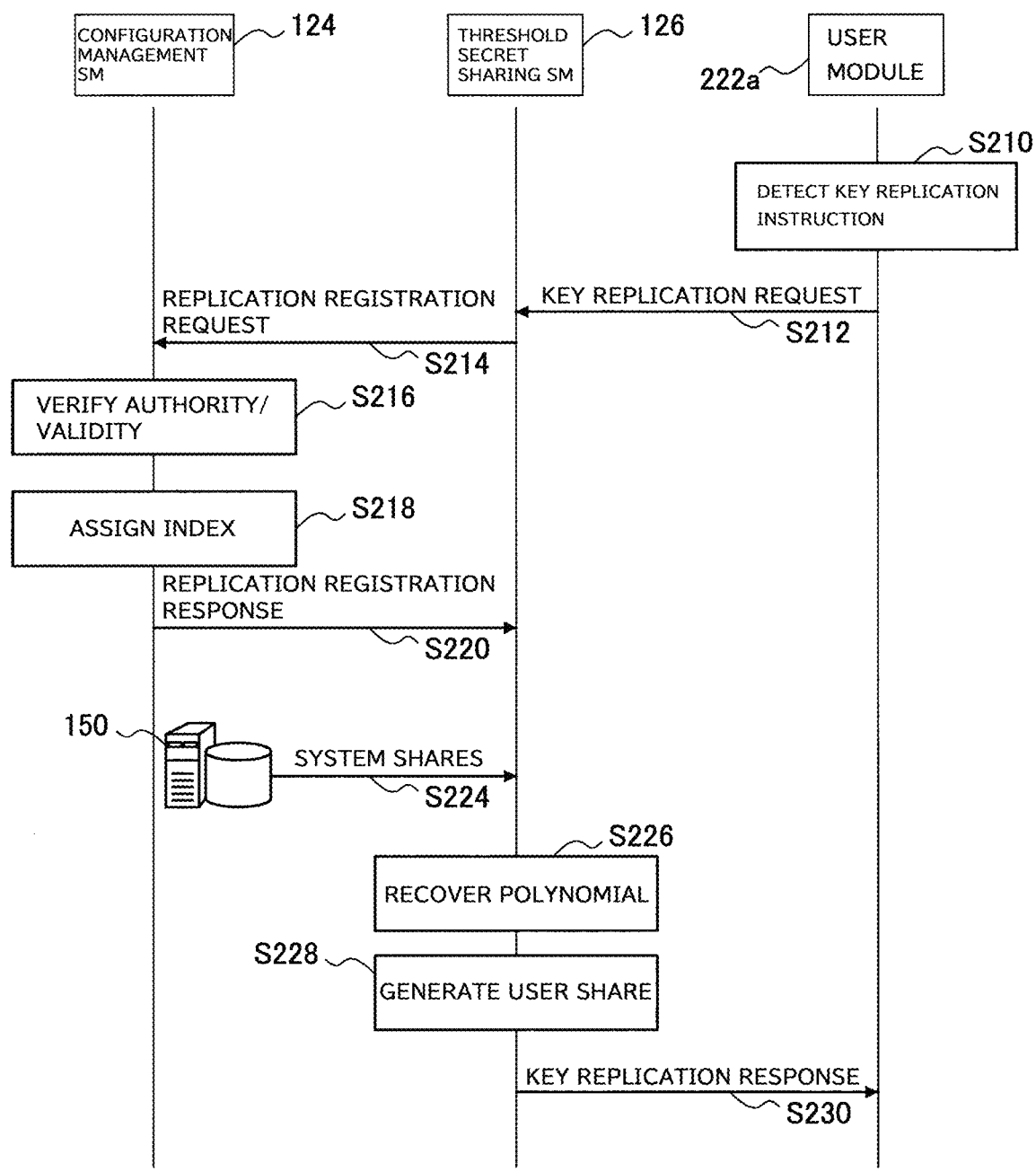

[Fig.13A]
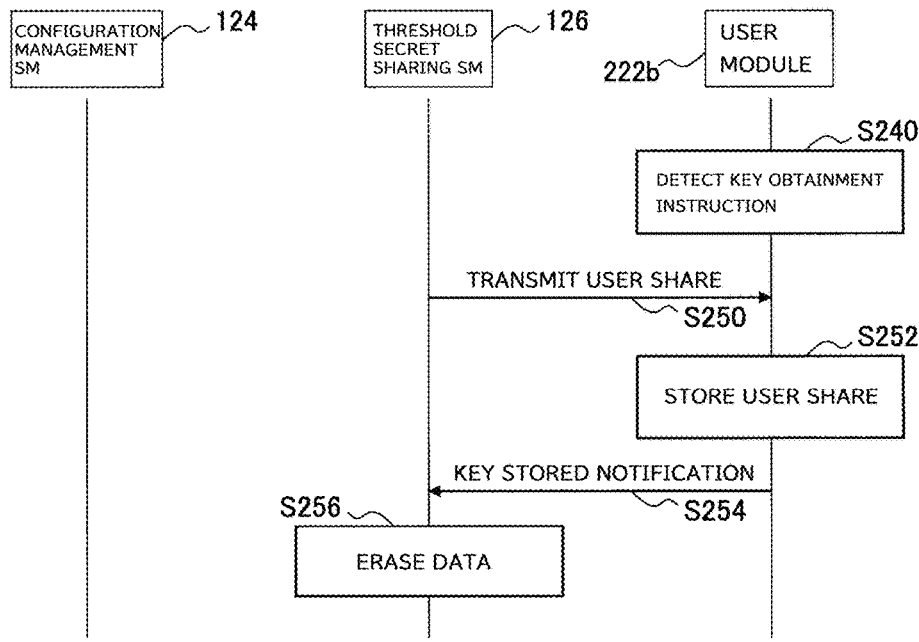
[Fig.13B]
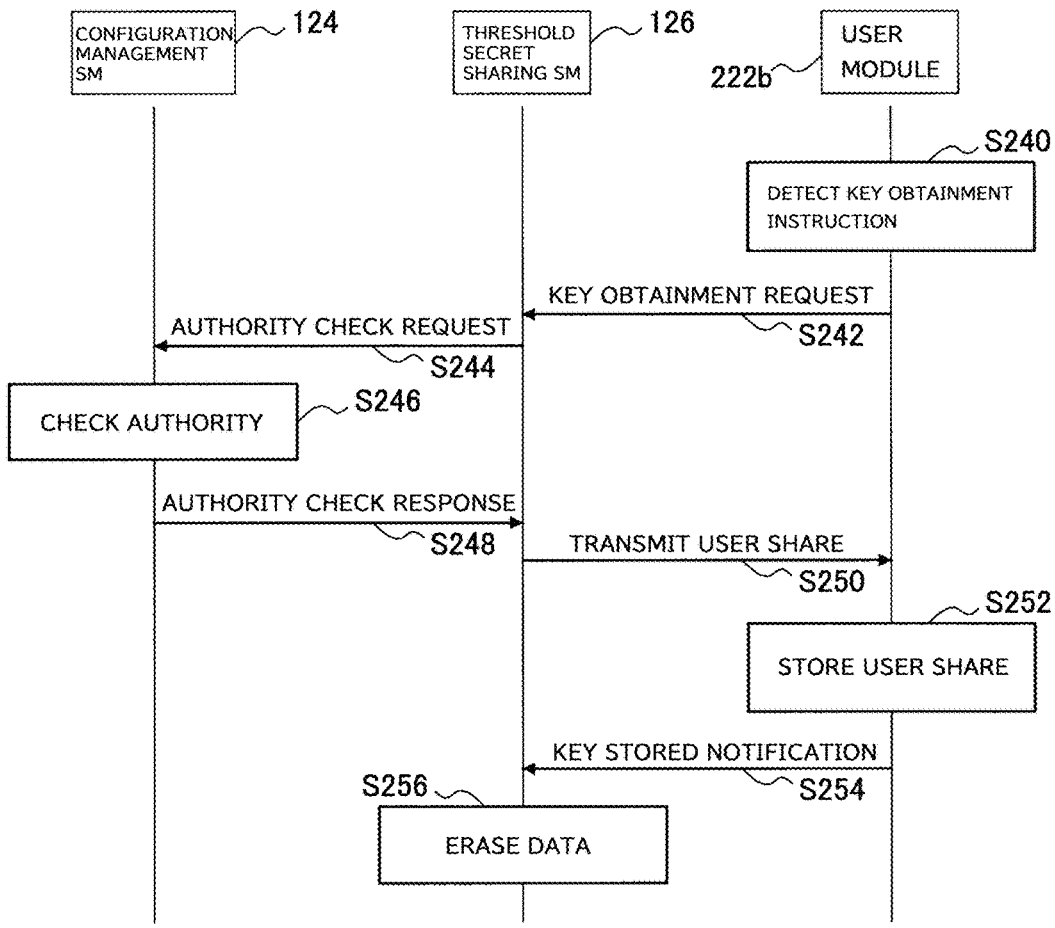

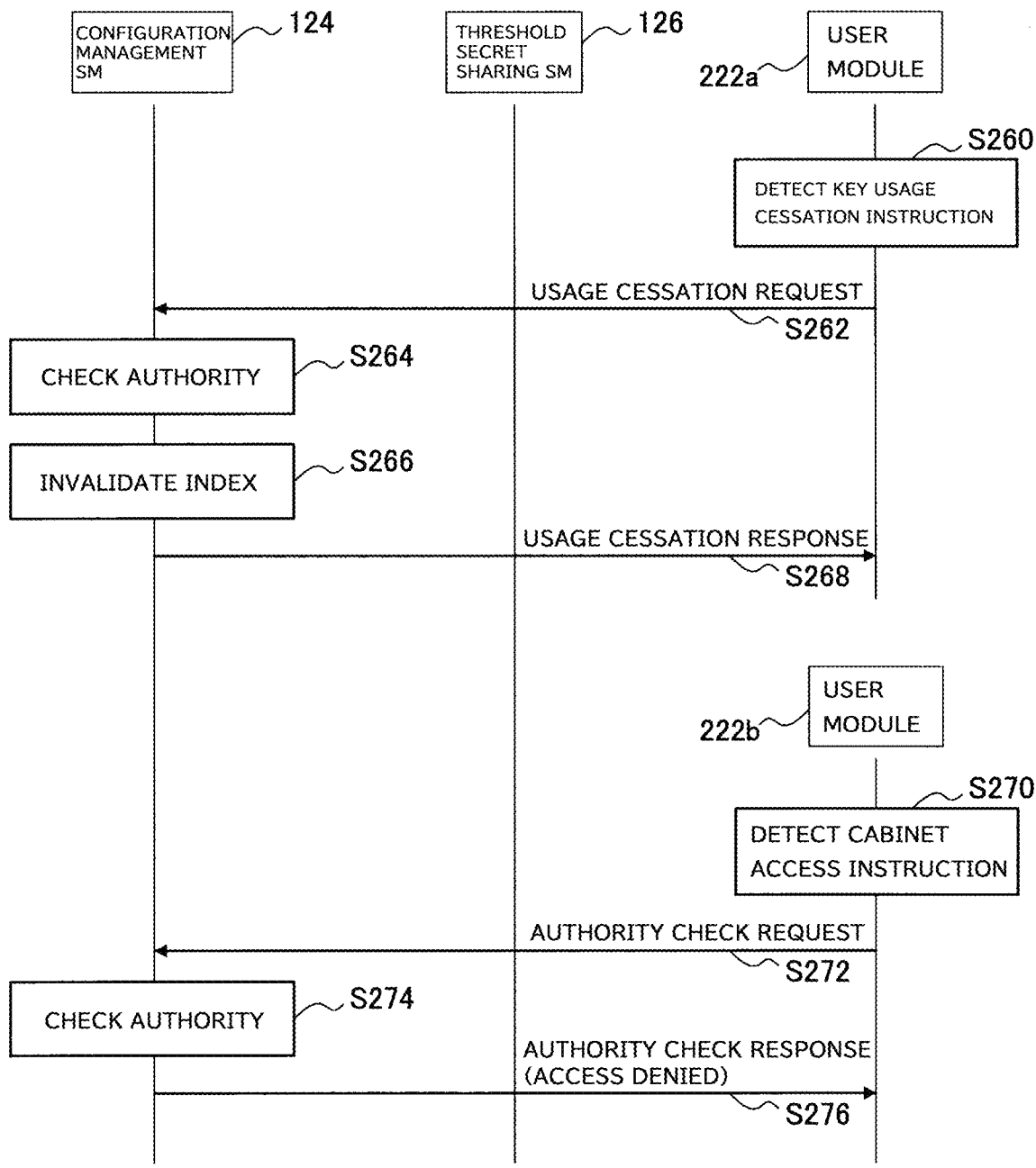
[Fig.14]

US 11,232,222 B2

ACCESS MANAGEMENT SYSTEM, ACCESS MANAGEMENT METHOD AND PROGRAM

RELATED APPLICATIONS

The present application is a National Phase of International Application No. PCT/JP2017/046732, filed Dec. 26, 2017, and claims priority based on Japanese Patent Application No. 2016-252820, filed Dec. 27, 2016.

TECHNICAL FIELD

The present disclosure relates to an access management system, an access management method and a program.

BACKGROUND ART

In recent years, there has been frequent leakage of information managed by corporations, public offices, educational institutions, or other organizations. It is one of the causes that there have been no sufficient mechanisms against illegal access to information or no sufficient mechanisms of preventing users from carelessly leaking information in spite of the fact that the development of information communication technologies made it easier to access information and increased information portability.

In general, access management for protecting information against security risks is carried out by defining access authority of each user in terms of terminal, folder, data file or the like. However, such access management is vulnerable against account hijacking or corruption by a system administrator (who has been given so-called root authority).

Secret sharing scheme is known as a technology that protects confidential data more strongly. According to threshold secret sharing scheme, which is a type of secret sharing scheme, data is split into n pieces (also referred to as shares) such that the original data cannot be recovered unless quorum k or more pieces out of the n pieces are put together. If threshold secret sharing scheme is applied to confidential data and the n pieces are distributed to n trustable users, the confidential data will never be leaked unless at least k users maliciously act together.

To address a problem that threshold secret sharing scheme significantly increases total data size as a result of splitting data into a plurality of pieces, NPL 1 proposes a technique to split an encryption key used in encrypting and decrypting data according to threshold secret sharing scheme into n pieces to distribute the n split pieces to n users, instead of splitting the data itself.

NPL 2 discloses a data conversion technology called All Or Nothing Transform (AONT) scheme. According to AONT scheme, data is transformed into a random bit sequence with little or no increase in total data size such that the original data cannot be recovered even if a single bit in the bit sequence is lost. A similar effect to the case of threshold secret sharing scheme with the number of shares n being equal to the quorum k can be achieved by splitting the AONT-transformed bit sequence into a plurality of pieces and distributing those pieces to a plurality of users (that is, the original data cannot be recovered unless n users act together). Therefore, AONT scheme can be treated as a type of secret sharing scheme, too.

CITATION LIST

Non-Patent Literature

[NPL 1] H. Krawczyk, "Secret Sharing Made Short", CRYPTO '93 Proceedings of the 13th Annual International Cryptology Conference on Advances in Cryptology, Pages 136-146, Aug. 22-26, 1993

[NPL 2] R. Rivest, "All-or-Nothing Encryption and The Package Transform", FSE '97 Proceedings of Fast Software Encryption, Pages 210-218, 1997

SUMMARY

Technical Problem

However, regardless of what kind of scheme is used, the constraint that data cannot be accessed unless the quorum of users come together would narrow use and application of secret sharing scheme. Usually, it is difficult to conclude, at the first moment of creating data to be kept in secret, how many users are to be granted access to the data. Meanwhile, if the data is not kept in secret until the number of users who share the data is determined, the primary purpose of enhancing security will be spoiled. To realize a mechanism of access management, it is important to enhance security and it is also important to sustain or improve user's convenience at the same time.

The technology according to the present disclosure provides a mechanism to solve or at least alleviate one or more of the above-described disadvantages of the existing technologies.

Solution to Problem

According to a first aspect, there is provided an access management system for managing access to data handled on a data server shared by a plurality of users. The access management system includes: a management module configured to keep data in a registered folder on the data server in secret by transforming the data into a meaningless bit sequence using an access key; at least one storage apparatus; and a configuration management database. The management module is configured to, when a folder registration request for a first user is received: register a data path of a folder assigned to the first user on the configuration management database; generate an access key; split the generated access key using threshold secret sharing scheme with a number of shares n and a quorum k into n shares; store i ($1 \le i < k$) shares out of the n shares in the at least one storage apparatus as system shares; set at least one remaining share other than the system shares out of the n shares to be a first user share provided to the first user; and register identification information of the system share and identification information of the first user share on the configuration management database in association with the data path. The first user share and the identification information of the first user share are stored in a memory of the first user. The management module is further configured to, when an access request for a registered folder from the first user is received: recover the access key based on the first user share and the identification information of the first user share received with the access request, the identification information of the system shares registered in association with the identification information of the first user share in the configuration management database, and the system shares obtained from the at least one storage apparatus; and deploy target data recovered using the recovered access key to the registered folder specified by the data path registered on the configuration management database.

The management module may further be configured to erase, after recovering the access key in response to the access request, the recovered access key when a notification of end of access is received, and the registered folder may be temporarily mounted onto the data server only during a period when the access key exists.

The management module may further be configured to transform the target data into a meaningless bit sequence using the access key in response to a saving request for the target data in the registered folder during a period when the access key exists.

The registered folder may include a single data file, a set of multiple files, or a mixture of a file and a folder as the target data or may be a vacant folder.

The identification information of the system share may be an index of the system share, and the identification information of the first user share may be an index of the first user share.

The management module may further be configured to, when a replication request for a user share from the first user is received, generate a second user share based on the first user share obtained from the memory of the first user and the system shares stored in the at least one storage apparatus, and set the generated second user share to be a user share provided to a second user designated by the first user.

The management module may further be configured to generate a third user share based on the second user share and the system shares in response to a request from the second user only in a case where the second user has been given authority for key replication.

The number of system shares i and the quorum k may satisfy i=k−1.

The management module may further be configured to manage data indicative of whether a user share that has been set is valid or not per index for polynomial interpolation based on the shares.

The management module may be configured to transform the target data into a meaningless bit sequence using a random bit sequence per segmented data block, and the access key may be the random bit sequence.

According to a second aspect, there is provided a method performed by a management module of an access management system for managing access to data handled on a data server shared by a plurality of users. The management module is configured to keep data in a registered folder on the data server in secret by transforming the data into a meaningless bit sequence using an access key. The method includes, when a folder registration request for a first user is received: registering a data path of a folder assigned to the first user on a configuration management database; generating an access key; splitting the generated access key using threshold secret sharing scheme with a number of shares n and a quorum k into n shares; storing i (1≤i<k) shares out of the n shares in at least one storage apparatus of the access management system as system shares; set at least one remaining share other than the system shares out of the n shares to be a first user share provided to the first user; and registering identification information of the system share and identification information of the first user share on the configuration management database in association with the data path. The first user share and the identification information of the first user share are stored in a memory of the first user. The method further includes, when an access request for a registered folder from the first user is received: recovering the access key based on the first user share and the identification information of the first user share received with the access request, the identification information of the system shares registered in association with the identification information of the first user share in the configuration management database, and the system shares obtained from the at least one storage apparatus; and deploying target data recovered using the recovered access key to the registered folder specified by the data path registered on the configuration management database.

According to a third aspect, there is provided a computer program stored in a computer-readable storage medium for, when executed by a processor of an information processing apparatus, in an access management system for managing access to data handled on a data server shared by a plurality of users, causing the processor to function as a management module configured to keep data in a registered folder on the data server in secret by transforming the data into a meaningless bit sequence using an access key. The management module is configured to, when a folder registration request for a first user is received: register a data path of a folder assigned to the first user on a configuration management database; generate an access key; split the generated access key using threshold secret sharing scheme with a number of shares n and a quorum k into n shares; store i (1≤i<k) shares out of the n shares in at least one storage apparatus of the access management system as system shares; set at least one remaining share other than the system shares out of the n shares to be a first user share provided to the first user; and register identification information of the system share and identification information of the first user share on the configuration management database in association with the data path. The first user share and the identification information of the first user share are stored in a memory of the first user. The management module is further configured to, when an access request for a registered folder from the first user is received: recover the access key based on the first user share and the identification information of the first user share received with the access request, the identification information of the system shares registered in association with the identification information of the first user share in the configuration management database, and the system shares obtained from the at least one storage apparatus; and deploy target data recovered using the recovered access key to the registered folder specified by the data path registered on the configuration management database.

According to a fourth aspect, there is provided a computer program product including: the computer program of the above-described third aspect (for example, a computer program that includes computer codes for causing a processor of an information processing apparatus to perform the method of the second aspect); and a computer-readable storage medium having stored thereon the computer program.

Advantageous Effects of Invention

The technology according to the present disclosure can solve or at least alleviate one or more of the above-described disadvantages of the existing technologies.

BRIEF DESCRIPTION OF DRAWINGS

FIG. 1 is an explanatory diagram for describing an overview of an access management system according to an embodiment;

FIG. 2 is a first explanatory diagram for describing a basic principle of access management according to an embodiment;

FIG. 3 is a second explanatory diagram for describing a basic principle of access management according to an embodiment;

FIG. 4 is an explanatory diagram for describing a basic principle of replication of a user share according to an embodiment;

FIG. 5 is a block diagram illustrating an example of a configuration of a management server according to an embodiment;

FIG. 6 is an explanatory diagram for describing indices of shares;

FIG. 7 is an explanatory diagram for describing ceasing usage of a share;

FIG. 8 is a block diagram illustrating an example of a configuration of a user terminal according to an embodiment;

FIG. 9 is an explanatory diagram for describing an overview of a sequence of operations from initiating access to target data by a user until ending the access;

FIG. 10 is a sequence diagram illustrating an example of a flow of a cabinet creation process according to an embodiment;

FIG. 11 is a sequence diagram illustrating an example of a flow of a cabinet access process according to an embodiment;

FIG. 12 is a sequence diagram illustrating an example of a flow of a key replication process according to an embodiment;

FIG. 13A is a sequence diagram illustrating a first example of a flow of a key obtaining process according to an embodiment;

FIG. 13B is a sequence diagram illustrating a second example of a flow of a key obtaining process according to an embodiment; and FIG. 14 is a sequence diagram illustrating an example of a flow of a key usage cessation process according to an embodiment.

DESCRIPTION OF EMBODIMENTS

Hereinafter, preferred embodiments of the present disclosure will be described in detail with reference to the appended drawings. In the present Specification and the drawings, constituent elements that have substantially the same function or configuration are denoted with the same reference numerals, thereby omitting duplicate explanations.

Descriptions will be given in the following order:
1. System Overview
2. Configuration Examples of Apparatuses
2-1. Access Management Server
2-2. User Terminal
3. Flows of Processes
3-1. Cabinet Creation Process
3-2. Cabinet Access Process
3-3. Key Replication Process/Key Obtaining Process
3-4. Key Usage Cessation Process
4. Conclusion

1. SYSTEM OVERVIEW (1) System Configuration Example

First, with reference to FIG. 1, an overview of an access management system according to an embodiment of the technology according to the present disclosure will be described. The access management system 1 shown in FIG. 1 includes an access management server 100, a storage server 150, and one or more user terminals 200a and 200b. The access management system 1 is configured for managing access to data handled on a data server shared by a plurality of users. Though two users Ua and Ub are shown in FIG. 1, the access management system 1 may include more users.

The access management server 100 is an information processing apparatus providing management functionalities for managing access to data that users desire to keep in secret. The access management server 100 is connected to one or more user terminals 200a and 200b via a network 5. The network 5 may be a private network (for example, local area network (LAN) or virtual private network (VPN)) of a corporation, a public office, an educational institution, or another organization or may be a public network such as the Internet or a cloud network. The access management server 100 is further connected to the storage server 150. The storage server 150 is data storage storing data that is subject to the access management by the access management server 100. The access management server 100 may be connected to the storage server 150 via the network 5 or may be connected to the storage server 150 via a network dedicated to storage that is constructed using a transport protocol such as Fibre Channel or internet Small Computer System Interface (iSCSI). For simplicity of explanation, FIG. 1 only shows a single access management server 100 and a single storage server 150. However, the management functionalities of the access management server 100 described below may be arranged in a plurality of server apparatuses in a distributed manner. In addition, the data being subject to the access management may be stored in a plurality of data storages.

The user terminal 200a is a terminal apparatus owned by the user Ua. The user terminal 200b is a terminal apparatus owned by the user Ub. In the present Specification, when it is not necessary to distinguish these user terminals with each other, they are collectively termed 'user terminal 200' by omitting the trailing alphabets of reference numerals. Reference numerals of other constituent elements are also treated in a similar way. The user terminal 200 may be, for example, any type of terminal apparatus such as a notebook personal computer (PC), a tablet PC, a desktop PC, a smartphone, a cellular phone, a navigation terminal, or a personal digital assistant (PDA). A user may handle data in various forms using the user terminal 200 such as, for example, texts, documents, communication messages, images, videos, audios, configuration data or executable files. Data handled on the user terminal 200 includes data that the user desires to keep in secret.

In a scenario, the user Ua is an executive officer of a corporation. The user Ua creates confidential data to be kept in secret on the user terminal 200a. According to a conventional typical way of access management, the user Ua stores the created confidential data in a shared server of the corporation (for example, the storage server 150 or another server not shown). Access authority is given to the user per folder or file on the shared server and the access authority is managed by a directory service. When accessing the shared server, the user Ua inputs his or her ID and password to an authentication screen and, upon successful authentication, accesses the confidential data in the shared server. The user Ub, who is another executive officer, can also access the same confidential data after user authentication using ID and password if he or she has been given valid access authority. In addition to the user authentication or independently of the user authentication, terminal authentication may sometimes be performed based on a terminal specific address of the user terminal (for example, an IP address or MAC address).

A disadvantage of the above-described conventional way of access management is vulnerability toward a risk that an account having root authority required for operating a shared server (also referred to as super-user authority) is hijacked and a risk of corruption by a system administrator who has been legitimately given the root authority. In many organizations, system administrators are not members responsible for the organizations' activities but may rather be specialized engineers having proper information technology (IT) skills. A responsible person of each organization often is not a system administrator (even though he or she is given stronger access authority compared to the other members) but a mere user in terms of information systems. In such a circumstance, it is difficult for the responsible person to always monitor actions of a system administrator to prevent security risks. Once root authority is acquired by a malicious person, confidential data stored in a shared server may be freely browsed, manipulated, and leaked to the outside.

Secret sharing scheme is known as a technology that protects confidential data more strongly against the above-described security risks. According to the existing Secret sharing scheme, confidential data is split into a plurality of shares and the shares are distributed respectively to a plurality of users. Access to the original confidential data is made possible only when a quorum or more shares are put together. For example, in the case of FIG. 1, assuming that the quorum k is equal to three (k=3), it will be made possible to recover the original confidential data when the user Ua provides the first share, the user Ub provides the second share, and a third user, not shown, provides a third share.

However, the fact that data cannot be accessed if any one of the users is absent (the quorum is not satisfied) would impose a constraint on user's activities and considerably degrade convenience. Moreover, it is usually difficult to conclude, at the first moment of creating data to be kept in secret, how many users are to be granted access to the data. Meanwhile, if the data is not kept in secret until the number of users who share the data is determined, the primary purpose of enhancing security will be spoiled.

An embodiment of the technology according to the present disclosure are introduced to solve or at least alleviate one or more of the above-described disadvantages of the existing technologies. In an embodiment, the access management server 100 splits an access key, which is required for accessing data to be kept in secret, using threshold secret sharing scheme with a number of shares n and a quorum k into n shares. For example, the access key may be such as a bit sequence required for recovering the original data from a randomized data, an encryption key required for decrypting an encrypted data or a password required for unlocking access to the data. In the present Specification, the term "keep data in secret" is intended to broadly encompass technologies related to data protection such as transforming data so that the original data cannot be inferred, randomizing data into a meaningless bit sequence, encrypting data, shutting off accesses to data and so on. Out of the n shares, i ($1 \le i < k$) shares are stored in the storage server 150 as system shares. The access management server 100 also sets at least one remaining share other than the system shares out of the n shares to be a user share. The user Ua receives at least one user share assigned to him or her, which is stored in, for example, a memory 250. As described later in detail, the user Ua will only need to provide the access management server 100 with the user share in the memory 250 and some supplementary information when he or she desires to access the data kept in secret (for example, confidential data stored in the storage server 150). The storage server 150 stores the i system shares but, since the i system shares do not satisfy the quorum k, illegal access to the data will be prevented even when a malicious person having root authority succeeded in reading out the system shares. The memory (owned by each user) that stores the user share may be an external storage medium like the memory 250 shown in FIG. 1 or may be a storage medium integrated in a user terminal like a memory 210

(2) Basic Principle

Next, with reference to FIGS. 2 to 4, the basic principle of access management according to an embodiment will be specifically described. In the embodiment described herein, a random bit sequence used in AONT or inverse AONT transform of data to be kept in secret is adopted as the above-described access key.

The box labeled as "M" at the lower left of FIG. 2 represents target data that a user desires to keep in secret. The target data may include a single data file, a set of multiple files, or a mixture of a file and a folder or may be a vacant folder. In an embodiment, the target data is a data set in a registered folder on a data server as further described later.

When starting access management, a random bit sequence R is generated first (step S11). The random bit sequence R may be a bit sequence representing a cryptographic pseudo random number. The random bit sequence R is split using threshold secret sharing scheme with the number of shares n and the quorum k into n shares $K_1, \ldots, K_n$ (step S12). Typically, n may be equal to k. Then, i ($1 \le i < k$) shares $K_1, \ldots, K_i$ out of the n shares are stored in at least one storage apparatus of the access management system 1 as system shares without being distributed to users (step S13). Meanwhile, at least one remaining share is set as a user share to be provided to a user and stored in a memory owned by the user (step S14). This memory of the user is not accessible by a system administrator of the access management system 1. The initial user may be registered on the system as the owner who has replication authority of the user share. Upon completion of setting the user share, the random bit sequence R may be erased (step S15). The access management system 1 registers, on the database described below, configuration information that defines configurations related to the access key such as which user share has been distributed to which user and which system share has been stored in which storage area of which storage apparatus.

Meanwhile, at the time of initial generation of shares or at a later timing than the initial generation, the target data M is transformed (or split) by AONT scheme using the random bit sequence R into one or more split data pieces $X_1, \ldots, X_m$ ($1 \le m$) (step S21). The split data pieces $X_1, \ldots, X_m$ are stored in at least one storage apparatus (step S22).

Due to the nature of AONT scheme, the target data M will be irrecoverable even if a single bit in the bit sequence of the split data pieces $X_1, \ldots, X_m$ (or concatenation thereof, which is the transformed data X) is lost.

As an example, the transform procedure according to Optimal Asymmetric Encryption Padding (OAEP) scheme, which is a type of algorithm for implementing AONT scheme, is as the following A1) to A6):

A1) derive data M' with the bit length extended to a predetermined size by padding zeros into the target data M;

A2) extend the random bit sequence R using a cryptographic hash function G to a hash value G(R) with the above predetermined size;

A3) derive the transformed data X ($X_1, \ldots, X_m$) by XORing M' and G(R);

A4) downscale the transformed data X using a cryptographic hash function H to a hash value H(X) with the size that is the same as R;

A5) derive transformed data Y by XORing R and H(X); and

A6) output the concatenation of X and Y, which is X∥Y.

If the size of the target data M is larger than the above predetermined size, the entire target data M can be AONT-transformed by segmenting the target data M into a plurality of data portions and iterating the above procedure for each data portion. The inverse transform described below may also be iteratively performed for each data portion (data segment).

The inverse transform procedure according to OAEP scheme is as the following B1) to B3):

B1) divide the X∥Y into X and Y;

B2) derive the random bit sequence R by XORing Y and H(X); and

B3) derive the target data M by XORing X and G(R).

In the present embodiment, A4) to A6) in the above procedure are omitted in AONT transform of the target data M. Instead, the random bit sequence R is split using threshold secret sharing scheme into a plurality of shares $K_1, \ldots, K_n$ and only the smaller number of system shares than the quorum k are retained at the system side, thereby protection of the target data M is realized. When recovering the target data M in inverse AONT transform, B1) and B2) in the above procedure are omitted and the random bit sequence R is recovered from the k shares, instead. Note that the mechanism described herein is not limited to OAEP scheme and may be applied to any transform that is adapted to accept identical random bit sequences for transform and inverse transform as inputs.

FIG. 3 illustrates a basic principle for a user to access the target data M that has been kept in secret. Herein, it is assumed that the quorum k and the number of system shares i satisfy i=k−1.

First, the user transmits a user share $K_k$ to the system (step S31). Some supplementary information such as a user ID, a related index of the share, or some other identification information may be transmitted along with the user share $K_k$ to the system as needed. The system obtains, in addition to the user share $K_k$, i system shares $K_1, \ldots, K_i$ (step S32). Then, the random bit sequence R is recovered using threshold secret sharing scheme based on the user share $K_k$ and the system shares $K_1, \ldots, K_i$ (step S33).

Further, the split data pieces $X_1, \ldots, X_m$ are obtained from the storage (step S41) and concatenated data X obtained by concatenating the split data pieces $X_1, \ldots, X_m$ is inversely transformed into the target data M by AONT scheme using the random bit sequence R (step S42).

When a user who has been given replication authority provides his or her first user share, it will be possible to generate a second user share for another user to access the target data M because of the nature of threshold secret sharing scheme. FIG. 4 illustrates a basic principle of replication of a user share. Again, it is herein assumed that the quorum k and the number of system shares i satisfy i=k−1.

First, the owner user Ua transmits the first user share $K_k$ and supplementary information to the system (step S51). The system obtains, in addition to the first user share $K_k$, i system shares $K_1, \ldots, K_i$ according to configuration information (step S52). Then, based on the first user share $K_k$ and the system shares $K_1$, (k−1)-th-order polynomial (a set of coefficients of the polynomial) for threshold secret sharing scheme is recovered (step S53). Conceptually, this step is based on the principle that, if coordinates of k reference points are determined, the (k−1)-th-order polynomial of which locus passes through all of those reference points on a two-dimensional plane can be derived by polynomial interpolation. Further, a second user share $K_{k+1}$ can be generated by setting, on the locus of the polynomial, a (k+1)-th reference point which is different from the k reference points (step S54). This second user share $K_{k+1}$ may be distributed to the user Ub trusted by the user Ua (step S55). Because the quorum of shares for recovering the random bit sequence R is equal to k as described above, the user Ub can access the target data M using his or her user share $K_{k+1}$ according to the principle shown in FIG. 3 even if the user Ua is absent. If the user Ua gives replication authority to the user Ub, a user share may be additionally generated for still another user in response to a request from the user Ub.

As understood from the preceding descriptions, under the above principle, an access key (a random bit sequence R) per set of data transformed or recovered at the same time is required. In the present Specification, such a set of data accessed with an access key is referred to as "cabinet". When setting up an initial user key, the cabinet may be empty or may include some data. A user unlocks a cabinet (recovers a set of data) using a user key. Upon ending creation or update of a file, the cabinet is locked. The access management server 100 utilizes the storage server 150 to sustain system shares as well as substantial instances of split data accommodated by the cabinet. The cabinet is embodied substantially as a registered folder on the storage server 150. According to an embodiment, a registered folder representing a cabinet is temporarily mounted onto the server only during a period when a legitimate user is accessing the system using his or her access key (that is, the cabinet is open only during the period). When the user ends the access, the registered folder is unmounted (that is, the cabinet is closed). System administrators or malicious third person cannot access the data kept in secret as far as the cabinet is closed even if they know the data path of the registered folder. There may be a plurality of cabinets (that is, a plurality of data sets respectively accessed with separate access keys) in the access management system 1. A plurality of user keys for accessing respective cabinets may be distributed to a single user. User keys may be replicated for any number of trustable users. From the next section, an example of more detailed configuration of each apparatus for implementing such principles will be specifically described.

2. CONFIGURATION EXAMPLES OF APPARATUSES

2-1. Access Management Server (1) Hardware Configuration

FIG. 5 is a block diagram illustrating an example of a configuration of the access management server according to an embodiment. With reference to FIG. 5, the access management server 100 includes a communication interface 102, a connection interface 104, a main memory 112, a bus 118, a processor 120, and an internal storage 130.

The communication interface 102 is an interface for communications by the access management server 100 with other apparatuses via the network 5. The communication interface 102 may be a wired communication interface or a wireless communication interface.

The connection interface 104 is an interface for connecting external equipment or peripheral equipment to the access management server 100. The connection interface 104 supports, for example, a transport protocol such as Fibre Channel or iSCSI and connects one or more storage servers 150 to the access management server 100.

The main memory 112 is, typically, a volatile memory (for example, a random access memory (RAM)). The main memory 112 stores computer programs and data necessary for operations of the access management server 100 temporarily during execution of the operations.

The bus 118 is a signal line that interconnects the communication interface 102, the connection interface 104, the main memory 112, the processor 120, and the internal storage 130.

The processor 120 may be a central processing unit (CPU) or a micro processing unit (MPU), for example. The processor 120 executes a computer program that is stored in, for example, the internal storage 130 or some other storage medium in advance and read into the main memory 112 and thereby causes a management module 122 to operate. The management module 122 is a module that embodies the mechanism of the access management according to the present embodiment through keeping data in secret and recovering it. The management module 122 may be, for example, configured to keep data in a registered folder on a data server (for example, the storage server 150) shared by a plurality of users in secret by transforming the data into a meaningless bit sequence using an access key. In the present embodiment, the management module 122 includes a configuration management sub-module 124 and a secret splitting sub-module 126. The example of FIG. 5 is not a limitation and the configuration management sub-module 124 and the secret splitting sub-module 126 may be arranged respectively on physically separate server apparatuses. Roles of these functional modules will further be described later.

The internal storage 130 is a secondary storage apparatus of the access management server 100. The internal storage 130 may be, for example, a hard disc drive (HDD) or a solid state drive (SSD). The internal storage 130 may store the above-described computer program that is executed by the processor 120. Further, the internal storage 130 stores a database (DB) that is used by the above-described management module 122 for access management. In the present embodiment, as an example, the internal storage 130 stores a user DB 132 and a cabinet DB 134. Roles of these databases will further be described later.

(2) Management Module—Configuration Management Sub-Module

The configuration management sub-module 124 uses the user DB 132 to perform management on access authority of users that utilize the access management system 1. The configuration management sub-module 124 uses the cabinet DB 134 to perform management on configurations of cabinets generated within the access management system 1.

The user DB 132 stores, for example, a user information record that may contain data items for each user ID as follows:
"User_ID";
"Username";
"Position";
"Belonging Group";
"Cabinet_Creation_Authority_Flag";
"Cabinet_Utilization_Authority_Flag"; and
"Device_Identification_Information".

"User_ID" is an identifier for uniquely identifying a user. "Username" indicates a name of the user which is displayed on a screen. "Position" indicates a position of the user in the organization that operates the access management system 1. "Belonging Group" indicates a group to which the user belongs in that organization. "Cabinet_Creation_Authority_Flag" is a flag that indicates whether the user identified by the "User_ID" has authority to create a cabinet or not. "Cabinet_Utilization_Authority_Flag" is a flag that indicates whether the user identified by the "User_ID" has authority to utilize a cabinet or not. For example, a user whose "Cabinet_Creation_Authority_Flag" indicates "No" and whose "Cabinet_Utilization_Authority_Flag" indicates "Yes" is not allowed to request creating a cabinet but is allowed to access, using a replicated user key, a cabinet that has been created by another user. "Device_Identification_Information" is information that may be utilized when terminal authentication is performed. For example, the "Device_Identification_Information" may include either one or both of an address that is specific to a terminal owned by the user (for example, an IP address or a MAC address) and a device ID that is specific to a memory owned by the user.

When a cabinet is created, the configuration management sub-module 124 gives a cabinet ID to the created cabinet. The configuration management sub-module 124, then, registers attributes of the cabinet in association with the cabinet ID on the cabinet DB 134. The cabinet DB 134 stores, for example, a configuration information record that may contain data items for each cabinet ID as follows:
"Cabinet_ID";
"Cabinet_Name";
"Cabinet_Access_Address";
"Creation_Date_and_Time";
"Access_Date_and_Time";
"Data_Size";
"System_Split_Key_Index_List";
"Quorum";
"User_Split_Key_Index_List";
"User_ID_List_by_Index";
"Owner_User_ID"; and
"Deployment_Path".

"Cabinet_ID" is an identifier for uniquely identifying a cabinet. "Cabinet_Name" indicates a name of the cabinet which is displayed on a screen. "Cabinet_Access_Address" indicates an address used when a user terminal 200 accesses the cabinet (for example, a uniform resource locator (URL)). "Creation_Date_and_Time" indicates the date and time when the cabinet was created. "Access_Date_and_Time" indicates the date and time when the latest access to the cabinet was performed. "Data_Size" indicates the data size of target data contained in the cabinet. "System_Split_Key_Index_List" is a list of indices of i system shares. "Quorum" indicates the minimum number of shares that are required for unlocking the cabinet. In a case where the quorum is constant across the system, the data item "Quorum" may be omitted in the cabinet DB 134. "User_Split_Key_Index_List" is a list of indices of one or more user shares. "User_ID_List_by_Index" is a list of user IDs of users to which user shares are distributed corresponding to respective indices indicated by the "User_Split_Key_Index_List". "Owner_User_ID" indicates the user ID of the user registered as the owner of the cabinet. "Deployment_Path" indicates a data path which specifies a folder to which recovered target data is deployed when the target data in the cabinet is recovered.

It should be noted that, in the above example of configuration information, the indices of system shares are indices utilized in polynomial interpolation and are also treated as identification information that identify individual system shares. However, in another example, identification information for identifying a system share other than an index of the system share (for example, an identifier or an address) may be given and stored in the cabinet DB 134. Alternatively, in a case where common indices of system shares are predefined (for example, the indices of system shares are always "1" and "2" or the like), the cabinet DB 134 may not store the list of indices of the system shares. Similarly, in the above example of configuration information, the indices of user shares are indices utilized in polynomial interpolation and are also treated as identification information that identify individual user shares. However, in another example, identification information for identifying a user share other than an index of the user share may be given and stored in the cabinet DB 134. Indices of shares may be managed separately from key values as in the above example of configuration information or may be included as parts of key values.

When a cabinet is created, the access key is split into n shares by the secret splitting sub-module 126 mentioned later. The configuration management sub-module 124 sets i ($1 \leq i < k$) shares out of the n shares to be system shares and sets at least one remaining share to be a user share provided to a user who has requested to create the cabinet. Setting these shares includes registering corresponding indices to the above-mentioned index lists of the cabinet DB 134. Further, setting the user share includes registering the corresponding user ID to the "User_ID_List_by_Index". Typically, these indices (or identification information of respective shares) are registered on the configuration management database (that is, the cabinet DB 134) in association with a data path of a folder assigned to the target user. This data path corresponds to the above-mentioned "Deployment_Path" and the folder assigned to the target user will be the registered folder. When a user share is replicated, the configuration management sub-module 124 sets a new share generated by the secret splitting sub-module 126 to be a user share (a second user share) provided to another user (a second user) designated by the user (the first user) who has requested the replication. The index of the second user share is registered to the "User_Split_Key_Index_List" and the user ID of the second user is registered to the "User_ID_List_by_Index".

FIG. 6 is an explanatory diagram for describing indices of shares. The graph in FIG. 6 represents a locus of polynomial that is set when performing threshold splitting on a random bit sequence R being an access key for a cabinet. The horizontal axis of the graph corresponds to the domain and the vertical axis corresponds to the codomain of the polynomial. Herein, a value from the horizontal axis is referred to as an index and a value of the polynomial corresponding to a certain index (a value from the vertical axis) is referred to as a key value. As an example, assume that the quorum k equals three and the number of system shares i equals two. In this case, the configuration management sub-module 124 registers, for example, indices "1" and "2" as indices of system shares when a cabinet is created. The key value of a system share corresponding to the index "1" is $K_1$. The key value of a system share corresponding to the index "2" is $K_2$. The configuration management sub-module 124 assigns an index "3" to a user Ua who is the owner of the cabinet. The key value of a user share corresponding to the index "3" is $K_3$. Herein, since the quorum k equals three, the illustrated polynomial will be recoverable if the three indices "1", "2" and "3" as well as the corresponding three key values are collected. The configuration management sub-module 124 assigns an index "j" to a user Ub when replication of a user share is requested for the user Ub by the user Ua. The key value of the user share corresponding the index "j" is $K_j$. Assigning different indices to a plurality of users and issuing user shares respectively corresponding to the assigned indices in this way protects the key values from being doubly issued and makes key value management per user easier. Though natural numbers are used as the indices in the example here, in general, the indices may be any rational numbers.

The above-described "User_ID_List_by_Index" has a role as mapping data which maps indices for polynomial interpolation corresponding to respective user shares to users of the respective user shares. As an example, the configuration management sub-module 124 is configured to verify, when a user attempts to use a user share:
- whether the user has legitimate authority in the user DB 132; and
- whether the user has a valid mapping (a mapping between a valid index and a user ID) in the cabinet DB 134. The configuration management sub-module 124 allows a user with legitimate authority to use a valid user share (for example, unlock a cabinet or replicate a user share) while it rejects a user without legitimate authority to use a user share and rejects an invalid user share to be used.

FIG. 7 is an explanatory diagram for describing ceasing usage of a share. In FIG. 7, the locus of the polynomial that is set when performing threshold splitting on a random bit sequence R is represented, which is similarly to the one illustrated in FIG. 6. Assume that a cabinet has already been created and two system shares corresponding to indices "1" and "2" have been set. A user share corresponding to an index "3" has been set for a user Ua who is the owner of the cabinet. A user share corresponding to an index "5" has been set for a user Uc. In a case where it is judged that, for example, the user Uc is exposed to a security risk (for example, a memory is lost or an account is hijacked), the user Ua requests the configuration management sub-module 124 to cease usage of the share of the user Uc. In response to the request, the configuration management sub-module 124 registers an indication indicating that the index "5" has been invalidated to the "User_Split_Key_Index_List" in the cabinet DB 134. As a result, the user share corresponding to the index "5" will become unusable by the user Uc or a third person. As such, the "User_Split_Key_Index_List" may be considered as data indicating whether or not a user share that has been set is valid or not for each of indices for user-share-based polynomial interpolation.

Authority to replicate a user share may be given only to an owner user. It may be possible to add or change an owner user. Further, the authority to replicate a user share may be given to a user other than the owner user. However, only a user who has at least his or her own user share is allowed to request replication of a user share. As an example, assume that a second user, who is not an owner user, has a second user share. The configuration management sub-module 124 generates (that is, replicates) a third user share based on the second user share and system shares upon a request from the second user only in a case where the second user has been given authority for key replication (by an owner user, for example). The third user share may be set for a third user designated by the second user. "Key_Replication_Authority_Flag" that indicates whether each user is allowed to replicate a key or not may be additionally defined in the user DB 132. Moreover, an indication (for example, a flag) that indicates whether each of users listed in "User_ID_List_by_Index" has authority for key replication or not may be added to the cabinet DB 134.

(3) Management Module—Secret Splitting Sub-Module

The secret splitting sub-module 126 is a sub-module to perform secret splitting processing. More specifically, when a cabinet is created, the secret splitting sub-module 126 generates an access key that is required for accessing data to be kept in secret. In the present embodiment, the access key includes a random bit sequence that is used when performing transform or inverse transform by AONT scheme on the data to be kept in secret. The secret splitting sub-module 126 splits the generated access key using threshold secret sharing scheme with a number of shares n and a quorum k into n shares. The secret splitting sub-module 126, then, stores i ($1 \leq i < k$) shares out of the n shares in the storage server 150 as system shares. In addition, the secret splitting sub-module 126 provides a user with at least one remaining share set as a user share by the configuration management module 124 along with key information indicative of a corresponding index (and/or identification information of the user share). These user share and supplementary information are stored in a memory of the user as described later.

In a secure environment such as a private network, the user share may be transmitted from the access management server 100 to the user terminal 200 using any technique such as attaching to an e-mail. In a non-secure environment, the user share may be transmitted through a secure channel formed using a communication protocol such as Secure Shell (SSH), Transport Layer Security (TLS) or Secure Sockets Layer (SSL), for example. The secret splitting sub-module 126 may transmit, to a user module 222 on the user terminal 200 mentioned below, only a notification that the user share is available and the user share may be downloaded to the user terminal 200 upon access from the user module 222. The secret splitting sub-module 126 erases the user share that exists in the access management server 100 after the user share is successfully acquired by the user module 222.

The secret splitting sub-module 126 performs AONT transform on target data that a user has requested to be kept in secret using an access key such as a random bit sequence. In a case where AONT transform is performed after the user share at the system side is erased, the secret splitting sub-module 126 first receives at least one user share stored in a memory owned by the user from the user module 222. The user share may be received from the user module 222 described below, for example, when the user initiates access to a registered folder. The secret splitting sub-module 126 may receive, in addition to the user share, indication information of the user share (for example, an index of the user share). The secret splitting sub-module 126 obtains i system shares stored in the storage server 150. The secret splitting sub-module 126 is able to determine which system shares to obtain by referring to a corresponding configuration information record in the cabinet DB 134, for example. Necessary indices can also be obtained from the configuration information record in the cabinet DB 134. Then, the secret splitting sub-module 126 recovers the access key based on these user share and system shares (and the respective indices thereof) to use the recovered access key for AONT transform of the target data. The secret splitting sub-module 126 further splits the AONT-transformed data into one or more pieces of split data and causes the storage server 150 to store the pieces of split data. Once the access key used for AONT transform and the user share used for recovering the access key are erased, the target data will be irrecoverable only from the remaining information at the system side.

Also in a case where a user has requested an access to the target data that is kept in secret through AONT transform, the secret splitting sub-module 126 receives at least one user share stored in the memory owned by the user and supplementary information from the user module 222 in a similar manner. The secret splitting sub-module 126 further obtains, from the storage server 150, i system shares stored in the storage server 150. Indices of the system shares may be obtained from a configuration information record in the cabinet DB 134 as needed. The secret splitting sub-module 126 recovers the access key based on these user share and system shares (and the respective indices thereof). The secret splitting sub-module 126 obtains one or more pieces of split data from the storage server 150 to recover transformed data by concatenating the pieces of split data. Then, the secret splitting sub-module 126 uses the access key recovered based on the k shares to recover the target data by performing inverse AONT transform on the transformed data.

The secret splitting sub-module 126 deploys the target data recovered using the access key as described above, which may be a single data file, a set of multiple files, a mixture of a file and a folder, or a vacant folder, to a data path indicated by the "Deployment_Path" in the cabinet DB 134. The data path to which the target data is deployed may be a folder or a directory that is temporarily mounted onto the access management server 100 (or another data server). The secret splitting sub-module 126 may maintain the target data at the data path temporarily mounted only during a limited period when a substantial instance of the access key exists, and may unmount the data path and erase the associated data when the access has ended. The end of access may be notified from the user module 222 to the secret splitting sub-module 126 and the notification may be triggered by an event such as disconnection of the memory in which the user share is stored or an explicit instruction from the user, for example. The secret splitting sub-module 126 may be triggered by a time out when no user action has been detected over a predetermined time period to determine that the access has ended. Such a configuration can minimize the risk that a malicious third person reads the target data that has once been recovered.

The secret splitting sub-module 126 may, for example, monitor updates of target data via an operating system of the access management server 100. For example, a user updates the target data using an application that runs on the user terminal 200. The updates of the target data herein mean updating the above-exemplified data set and may include, for example, one or more of creating, updating and deleting a file, and creating, updating and deleting a sub-folder in the registered folder. The user or the application requests the access management server 100 to save the updated target data. This file saving request will be received by the operating system of the access management server 100. Upon detecting the file saving request for the target data via the operating system, the secret splitting sub-module 126 may AONT-transform the target data into one or more pieces of split data using the access key. By arranging an operating system to intervene between the secret splitting sub-module 126 and an application that is utilized for viewing and updating target data in that way, smooth cooperation between the access management system 1 and various applications that already exist and that may be developed in the future will be guaranteed.

When replication of a user share is requested from a legitimate user having a user share, the secret splitting sub-module 126 generates, based on the user share (and identification information thereof) obtained from a memory owned by the user and system shares stored in the storage server 150 (and identification information thereof), another user share for allowing another user to access the target data. As described using FIGS. 4 and 6, the replication of the user share may include assigning a new index to a designated user, deriving (k−1)-th-order polynomial based on k shares and deriving a key value corresponding to the new index. The secret splitting sub-module 126 provides the designated user with thus replicated user share along with key information indicative of the corresponding index.

2-2. User Terminal (1) Hardware Configuration

FIG. 8 is a block diagram illustrating an example of a configuration of a user terminal according to an embodiment. With reference to FIG. 8, the user terminal 200 includes a communication interface 202, a connection interface 204, an input interface 206, a display 208, a secondary storage apparatus 210, a main memory 212, a bus 218 and a processor 220.

The communication interface 202 is an interface for communication by the user terminal 200 with other apparatuses via the network 5. The communication interface 202 may include a wired LAN interface, a wireless LAN interface, a cellular communication interface or the like.

The connection interface 204 is an interface for connecting external equipment or peripheral equipment to the user terminal 200. The connection interface 204 may include, for example, a Universal Serial Bus (USB) interface, an integrated circuit (IC) card interface, a memory card interface or the like. In the example of FIG. 8, an external memory 250 is connected to the user terminal 200 via the connection interface 204.

The input interface 206 is a user interface (UI) that is used for a user to operate the user terminal 200 or input information to the user terminal 200. The input interface 206 may include any kind of interface such as a touch sensor, a key pad, a keyboard, buttons, a switch, a pointing device or the like, for example. The input interface 206 may include a speech input module that recognizes, as a user input, a speech command obtained via a microphone (not shown) from a user.

The display 208 is a display module such as a liquid crystal display (LCD), an organic light emitting diode (OLED) display or the like, for example. The display 208 may be used for displaying a graphical user interface (GUI) generated by the user module 222 mentioned later and displaying another application screen.

The secondary storage apparatus 210 may be, for example, an HDD or an SDD and stores a computer program that is executed by the processor 220, configuration data, application data and the like.

The main memory 212 is, typically, a volatile memory (for example, a RAM). The main memory 212 temporarily stores a computer program and data required for operation of the user terminal 200 when the operation is performed.

The bus 218 is a signal line that interconnects the communication interface 202, the connection interface 204, the input interface 206, the display 208, the secondary storage apparatus 210, the main memory 212 and the processor 220.

The processor 220 may be, for example, a CPU or an MPU. The processor 220 executes a computer program that is stored in, for example, the secondary storage apparatus 210 or some other storage medium in advance and read into the main memory 212 and thereby causes the user module 222 having a role as a client-side module of the access management system 1 to operate. The role of this functional module will be described next.

(2) User Module

The user module 222 manages an access from the user terminal 200 to a cabinet using a user share that is set by the access management server 100. The user module 222 is, for example, triggered to be activated by an event such as being selected from application menus or detecting a connection, to the user terminal 200, of the external memory 250 in which a user share is stored. The user module 222, for example, obtains information about available cabinets from the access management server 100 and causes the display 208 to display a list of the available cabinets and associated function menus.

The function menus that may be provided by the user module 222 to a user includes the followings, for example:
  Create New Cabinet;
  Access Cabinet;
  Replicate User Share;
  Cease Usage of User Share;
  Authorize Replication;
  Obtain User Share; and
  End Access (when accessing a cabinet).

It should be noted that the actual function menus that are displayed are different depending on authority of a user defined in the user DB 132. For example, the Create New Cabinet function is not provided to a user who has no authority to create a cabinet. The Access Cabinet function for a cabinet is not provided to a user who has not been registered on the cabinet DB 134 as a legitimate user allowed to access the cabinet. The Replicate User Share function, the Cease Usage of User Share function and the Authorize Replication function for a cabinet are not provided to a user who is not an owner user of the cabinet and has not been authorized for replication.

Upon receiving an instruction from a user to create a new cabinet, the user module 222 transmits a cabinet creation request to the access management server 100. The cabinet creation request at least includes a user ID of the user. When a user designates an identifier or a name of the cabinet, the cabinet creation request may further include these pieces of information. In response to the cabinet creation request, the access management server 100 creates the cabinet and sets a user share for accessing the created cabinet. The user module 222 obtains the user share and a corresponding index provided by the access management server 100 and stores the obtained user share and the index in a memory owned by the user. The user share and the index are stored in association with a cabinet ID. When the user share has been successfully stored in the memory, the user module 222 transmits a key stored notification to the access management server 100 to cause it to erase the user share at the system side and related data. The user share may be stored in the secondary storage apparatus 210 or stored in the external memory 250, for example. The user may store the user share in the external memory 250 and connect the external memory 250 to another user terminal, thereby carrying out next access from such another user terminal to the access management server 100.

Upon receiving an instruction from a user for accessing a cabinet, the user module 222 transmits an access request to the access management server 100. The access request includes a user ID of the user, a cabinet ID of the selected cabinet, a user share and a corresponding index, for example. The access management server 100 refers to the user DB 132 to check legitimacy of the user's authority. The access management server 100 also refers to a record identified by the cabinet ID in the cabinet DB 134 to verify whether the mapping between the user ID and the index corresponding to the user share is valid or not. The authority check may be performed before the access request. Upon successful authority check and verification of validity of the user share, the access management server 100 recovers an access key and recovers target data that has been kept in secret in the cabinet. The user module 222 obtains a data path included in an access response received from the access management server 100. As a result, the user module 222 or another application on the user terminal 200 is enabled to access the target data deployed on the access management server 100.

Upon receiving an instruction for ending access to the cabinet or disconnection of the external memory 250 that stores the user share from the user terminal 200, the user module 222 transmits an end-of-access notification to the access management server 100 to cause it to erase the user share that temporarily exist at the system side and related data.

Upon receiving an instruction from a first user to replicate a user share, the user module 222 transmits a key replication request to the access management server 100. The key replication request includes, for example, a user ID of the first user, a cabinet ID of a selected cabinet, a user share, a corresponding index and a user ID of a designated second user (a user who is to receive a replicated user share). The second user may be designated by the first user through a GUI provided by the user module 222, for example. The access management server 100 refers to the user DB 132 to check whether the first user has legitimate authority for key replication and whether the second user has authority for cabinet utilization. The access management server 100 also refers to a record identified by the cabinet ID in the cabinet DB 134 to verify whether the mapping between the user ID and the index corresponding to the user share is valid or not. Upon successful authority check and verification of validity of the user share, the access management server 100 creates a new user share.

After a user share is created or replicated for a user of the user terminal 200 by the access management server 100, the user module 222 may be instructed to obtain the user share. As an example, in response to detecting such an instruction, the user module 222 waits for receiving the user share and a corresponding index provided by the access management server 100. Once the user module 222 receives the user share and the index from the access management server 100, the user module 222 stores the user share and the index in a memory in association with the cabinet ID. When the user share has been successfully stored in the memory, the user module 222 transmits a key stored notification to the access management server 100 to cause it to erase the user share at the system side and related data. As another example, the user module 222 may transmit a key obtainment request to the access management server 100 upon receiving an instruction to obtain a user share. The key obtainment request at least includes a user ID and a cabinet ID. After the user's authority is checked, the user module 222 may receive the user share and a corresponding index provided from the access management server 100.

Upon receiving an instruction from a first user to cease usage of a user share replicated for a second user, the user module 222 transmits a usage cessation request to the access management server 100. The usage cessation request includes, for example, a user ID of the first user, a cabinet ID and a user ID of the designated second user. An index of a user share of which usage is to be ceased may be included in the usage cessation request instead of the user ID of the second user. When the first user is a legitimate owner user, the access management server 100 ceases usage of the user share that has been replicated for the second user by deleting or invalidating the index of the user share in the "User_Split_Key_Index_List".

FIG. 9 is an explanatory diagram for describing an overview of a sequence of operations from initiating access to target data by a user until ending the access.

Assume that a valid user share has been already stored in the memory 250. When the memory 250 is connected to the user terminal 200 via the connection interface 204, the user module 222 detects the user share in the memory 250. The user module 222 initiates access to a selected cabinet by transmitting a cabinet ID of the selected cabinet, the user share and a corresponding index to the access management server 100. The access management server 100 recovers a random bit sequence R based on the received user share and i system shares. The access management server 100, then, inversely transforms m pieces of split data $X_1, \ldots, X_m$ using the random bit sequence R into target data M. A user can view, reproduce or update the thus recovered target data M using any application on the user terminal 200. After the user updates the target data M to M' and requests to save the target data M', the access management server 100 transforms (splits) the target data M' using the random bit sequence R into m pieces of split data $X'_1, \ldots, X'_m$. After the user updates the target data M' further to M" and requests to save the target data M", the access management server 100 transforms (splits) the target data M" using the random bit sequence R into m pieces of split data $X''_1, \ldots, X''_m$. These pieces of split data may be stored in the storage server 150 whenever the data is updated or may be stored in the storage server 150 at a later timing of an end of access. When the user instructs to end the access or the memory 250 is disconnected from the user terminal 200, the user module 222 notifies the access management server 100 of the end of access. In response to this notification, the access management server 100 erases the random bit sequence R that has been used as the access key and the target data M".

According to the scenario illustrated in FIG. 9, a substantial instance of target data exists in the system only during a period when a user having a valid user share accesses the access management system 1. Before or after the period, since the number of shares that are available in the system does not satisfy the quorum k, the access key (the random bit sequence) is irrecoverable in theory due to the nature of threshold secret sharing scheme, which in turn results in that the target data is also irrecoverable due to the nature of AONT scheme. Meanwhile, the access key can be recovered by a legitimate user providing the system with at least one user share of the user and thus the target data will become accessible. Another legitimate user can also access the target data by providing the system with a user share of the user that has been validly replicated. As there is no upper limit on the number of replicated user shares, the above-described technique has outstanding scalability to change in the number of users in addition to high data secrecy.

Note that, in the examples described in this section, an index of a user share obtained by the user module 222 from the access management server 100 is treated as identification information that identifies the individual user share. In another example, there may exist identification information for identifying a user share separately from the index of the user share. In this case, the user module 222 may receive the identification information of the user share in stead of or in addition to the index of the user share from the access management server 100 to store it in a memory of the user. Moreover, the user module 222 may transmit the identification information of the user share to the access management server 100 along with the above-described access request or key replication request.

3. FLOWS OF PROCESSES

In this section, some flows of processes performed in the above-described access management system 1 will be described in detail using sequence diagrams.

3-1. Cabinet Creation Process

FIG. 10 is a sequence diagram illustrating an example of a flow of a cabinet creation process according to an embodiment. The cabinet creation process illustrated in FIG. 10 involves the configuration management sub-module 124 and the secret splitting sub-module 126 of the access management server 100, the storage server 150 and the user module 222 of the user terminal 200.

First, the user module 222 transmits a cabinet information request to the configuration management sub-module 124 (step S100). The configuration management sub-module 124 transmits a cabinet information response including information regarding available cabinet(s) for the user to the user module 222 (step S102). The user module 222 causes a function menu "Create New Cabinet" to be displayed based on information included in the cabinet information response.

If the user selects the "Create New Cabinet" on the GUI, for example, the user module 222 detects a cabinet creation instruction (step S110). In response to detecting the cabinet creation instruction, the user module 222 transmits a cabinet creation request to the secret splitting sub-module 126 (step S112). The secret splitting sub-module 126 transmits a cabinet registration request to the configuration management sub-module 124 in response to receiving the cabinet creation request (step S114). The cabinet creation request or the cabinet registration request herein may be regarded as a folder registration request for the sake of a first user. The configuration management sub-module 124 checks whether the user that has instructed the cabinet creation has legitimate authority for creation (step S116). If the user has the legitimate authority for creation, the configuration management sub-module 124 registers a new cabinet to the cabinet DB 134 (step S118). More specifically, the configuration management sub-module 124, for example, assigns an index and a data path of an available folder, newly generates a configuration information record as described above, and registers the generated configuration information record on the cabinet DB 134. The registered record includes, for example, indices (and/or identification information) of system/user shares to be generated as well as the data path of the folder assigned to the user. The configuration management sub-module 124, then, transmits a cabinet registration response to the secret splitting sub-module 126 (step S120). The cabinet registration response includes, for example, the index value assigned to the user.

The secret splitting sub-module 126 generates an access key (R) (step S122) and splits the generated access key into n shares (step S124). The secret splitting sub-module 126 stores i shares out of the n shares in the storage server 150 as system shares (step S126). The secret splitting sub-module 126 sets at least one remaining share other than the system shares out of the n shares to be a user share provided to the user (step S127). This user share is the share corresponding to the index (for example, i+1) assigned to the user. The secret splitting sub-module 126 transmits a cabinet creation response including the cabinet ID, the user share and the corresponding index to the user module 222 (step S128).

In response to receiving the cabinet creation response, the user module 222 stores the user share and the corresponding index in a memory owned by the user in association with the cabinet ID (step S130). The user module 222, then, transmits a key stored notification to the secret splitting sub-module 126 (step S132). The secret splitting sub-module 126 erases the user share and related data (step S134).

3-2. Cabinet Access Process

FIG. 11 is a sequence diagram illustrating an example of a flow of a cabinet access process according to an embodiment. The cabinet access process illustrated in FIG. 11 involves the configuration management sub-module 124, the secret splitting sub-module 126, the storage server 150 and the user module 222.

Assume that a GUI including "Access Cabinet" function menu is displayed on the user terminal 200 before access to a cabinet is initiated. If a user selects the "Access Cabinet" on the GUI, for example, the user module 222 detects a cabinet access instruction (step S140). In response to detecting the cabinet access instruction, the user module 222 transmits an authority check request to the configuration management sub-module 124 (step S142). The configuration management sub-module 124 refers to the user DB 132 to check legitimacy of the user's authority (step S144) and transmits an authority check response to the user module 222 (step S146). Herein, it is assumed that the user has legitimate authority for accessing a cabinet. The user module 222 transmits an access request to the secret splitting sub-module 126 (step S148). The access request herein may be regarded as a request for accessing a registered folder from the first user. The access request includes a user ID of the user, a cabinet ID of a selected cabinet, a user share and a corresponding index (and/or identification information of the user share) as described above.

The secret splitting sub-module 126 transmits a verification request for verifying validity of the user share to the configuration management sub-module 124 in response to receiving the access request (step S150). The configuration management sub-module 124 refers to a record identified by the cabinet ID in the cabinet DB 134 to verify whether the mapping between the user ID and the index corresponding to the user share is valid (step S152) and transmits a verification response to the secret splitting sub-module 126 (step S154). Herein, it is assumed that the user share is valid.

The secret splitting sub-module 126 obtains i system shares stored in the storage server 150 (step S156) and recovers an access key based on the user share received from the user module 222 and the i system shares (step S158). The secret splitting sub-module 126 can determine which system shares to obtain by referring to identification information of system shares (for example, the "System_Split_Key_Index_List") registered on the cabinet DB 134, for example. In general, recovery of an access key is performed through polynomial interpolation based on key values of a number of shares (a user share and system shares) satisfying the quorum and respective corresponding indices. For example, the access key may be an intercept corresponding to the index "0" of a locus of a polynomial as exemplified in FIG. 6. Next, the secret splitting sub-module 126 obtains pieces of split data stored in the storage server 150 (step S160) and recovers target data through concatenation of the pieces of split data and inverse transform using the recovered access key (step S162). Next, the secret splitting sub-module 126 deploys the recovered target data to a registered folder specified by a data path registered on the cabinet DB 134 (step S163). The secret splitting sub-module 126, then, transmits an access response indicating that the target data has been recovered to the user module 222 (step S164).

The user module 222 enables the recovered target data to be viewed or updated using the data path included in the access response (step S166). When the target data is updated on the user terminal and saving the updated target data is requested, the secret splitting sub-module 126 performs AONT transform on the updated target data using the access key and generates one or more pieces of split data (step S168).

Upon detecting an access ending instruction or detecting disconnection of a memory that stores the user share, the user module 222 transmits an end-of-access notification to the secret splitting sub-module 126 (step S170). The secret splitting sub-module 126 erases the access key, the user share and related data (step S172).

3-3. Key Replication Process/Key Obtaining Process (1) Key Replication Process FIG. 12 is a sequence diagram illustrating an example of a flow of a key replication process according to an embodiment. The key replication process illustrated in FIG. 12 involves the configuration management sub-module 124, the secret splitting sub-module 126, the storage server 150 and a user module 222*a* of a first user.

Assume that a GUI including "Replicate User Share" function menu is displayed on the user terminal 200*a* before replication of a key is initiated. The first user selects the "Replicate User Share" on the GUI, for example, and designates a user to which a new key is to be distributed. The user module 222*a* detects a key replication instruction (step S210) and transmits a key replication request to the secret splitting sub-module 126 (step S212).

In response to receiving the key replication request, the secret splitting sub-module 126 transmits a replication registration request to the configuration management sub-module 124 (step S214). The configuration management sub-module 124 checks authority of the first user that has instructed the key replication and the designated second user and verifies validity of a user share received from the user module 222*a* (step S216). If both of the users have legitimate authority and the user share is valid, the configuration management sub-module 124 assigns a new index for the selected cabinet to the second user (step S218). The configuration management sub-module 124, then, transmits a replication registration response to the secret splitting sub-module 126 (step S220). The replication registration response includes, for example, the index value assigned to the second user.

The secret splitting sub-module 126 obtains i system shares stored in the storage server 150 (step S224) and recovers a polynomial based on the user share received from the user module 222*a* and the i system shares (step S226). The secret splitting sub-module 126 generates a user share for the second user by calculating a value of the polynomial corresponding to the index assigned to the second user (step S228). The secret splitting sub-module 126, then, transmits a key replication response indicating that the user share has been replicated to the user module 222*a* (step S230).

(2) Key Obtaining Process

FIG. 13A is a sequence diagram illustrating a first example of a flow of a key obtaining process according to an embodiment. The key obtaining process illustrated in FIG. 13A involves the secret splitting sub-module 126 and a user module 222*b* of the second user.

Assume that a GUI including "Obtain User Share" function menu is displayed on the user terminal 200*b* before obtainment of a key is initiated. If the second user selects the "Obtain User Share" on the GUI, for example, the user module 222*b* detects a key obtainment instruction (step S240) and enters a state of waiting for receiving a user share. The key obtainment instruction may be received from a user terminal of another user who has requested replication of a user share or from the access management server 100. The secret splitting sub-module 126 transmits, to the user module 222*b*, the user share for the second user generated as a result of the key replication process as exemplified in FIG. 12 along with the corresponding index and an associated cabinet ID (step S250).

The user module 222*b* stores the received user share and the corresponding index in a memory owned by the second user in association with the cabinet ID (step S252). The user module 222*b*, then, transmits a key stored notification to the secret splitting sub-module 126 (step S254). The secret splitting sub-module 126 erases the user share and related data (step S256).

FIG. 13B is a sequence diagram illustrating a second example of a flow of a key obtaining process according to an embodiment. The key obtaining process illustrated in FIG. 13B involves the configuration management sub-module 124, the secret splitting sub-module 126 and the user module 222*b* of the second user.

The user module 222*b* detects a key obtainment instruction (step S240). Upon detecting the key obtainment instruction, the user module 222*b* transmits a key obtainment request to the secret splitting sub-module 126 (step S242). In response to receiving the key obtainment request, the secret splitting sub-module 126 transmits an authority check request to the configuration management sub-module 124 (step S244). The configuration management sub-module 124 checks whether the second user has legitimate authority to use the replicated user share (step S246) and transmits an authority check response indicative of the result to the secret splitting sub-module 126 (step S248). Herein, it is assumed that the second user has legitimate authority. The secret splitting sub-module 126 transmits, to the user module 222*b*, the user share for the second user generated as a result of the key replication process exemplified in FIG. 12 along with the corresponding index and the associated cabinet ID (step S250).

The user module 222*b* stores the received user share and the corresponding index in a memory owned by the second user in association with the cabinet ID (step S252). The user module 222*b*, then, transmits a key stored notification to the secret splitting sub-module 126 (step S254). The secret splitting sub-module 126 erases the user share and related data (step S256).

3-4. Key Usage Cessation Process

FIG. 14 is a sequence diagram illustrating an example of a flow of a key usage cessation process according to an embodiment. The key usage cessation process illustrated in FIG. 14 involves the configuration management sub-module 124, the user module 222a of the first user and the user module 222b of the second user.

Assume that a GUI including "Cease Usage of User Share" function menu is displayed on the user terminal 200a before cessation of using a key is requested. The first user selects the "Cease Usage of User Share" for a certain cabinet and designates a user who has the key being subject to the cessation. Herein, it is assumed that the second user is designated. The user module 222a detects a key usage cessation instruction (step S260) and transmits a usage cessation request to the configuration management sub-module 124 (step S262).

The configuration management sub-module 124 refers to the user DB 132 to check legitimacy of the first user's authority (step S264) and, if the first user has legitimate authority, invalidates the index of the second user for the selected cabinet in the cabinet DB 134 (step S266). Then, the configuration management sub-module 124 transmits, to the user module 222a, a usage cessation response indicating that usage of the user share of the second user has been ceased (step S268).

After that, when the second user instructs access to the cabinet at the user terminal 200b (step S270), the user module 222b of the user terminal 200b transmits an authority check request to the configuration management sub-module 124 (step S272). The configuration management sub-module 124 refers to the user DB 132 to check legitimacy of the second user's authority (step S274). Herein, since the index of the second user for the selected cabinet has been invalidated in the cabinet DB 134, the configuration management sub-module 124 determines that the second user does not have legitimate authority for accessing the cabinet. Consequently, the configuration management sub-module 124 transmits, to the user module 222b, an authority check response indicating that the access is denied (step S276).

In any of the processes described in this section, the process steps may not necessarily be performed in the illustrated order. Some process steps may be performed in parallel. An additional process step may be adopted and some of the process steps may be omitted.

4. CONCLUSION

Embodiments of the technology according to the present disclosure have been described in detail using FIGS. 1 to 14 so far. In the above-described embodiments, in an access management system for managing access to data kept in secret, an access key required for accessing the data kept in secret is split using threshold secret sharing scheme with a number of shares n and a quorum k into n shares, i (1≤i<k) shares out of the n shares are stored in one or multiple of storage apparatuses as system shares, and at least one remaining share out of the n shares is set to be a first user share provided to a first user. According to such a configuration, since the number of system shares retained at the system side does not satisfy the quorum k, the access key will never be recovered whatever corruption is practiced in the system and, thus, illegal access to the data kept in secret is prevented. The first user can access desired data by providing the system with at least one user share that has been set for the first user to cause the system to recover the access key. In that case, because it is not necessary for many users to come together and provide their respective shares, no constraint is imposed on normal activities of the users and user's convenience is not impaired.

In the above-described embodiments, the access management system is configured to manage an access to data handled on a data server shared by a plurality of users and data in a registered folder on the data server is kept in secret by transforming it into a meaningless bit sequence using the access key. The configuration management database of the access management system stores identification information of the system share and identification information of the first user share in association with a data path of a registered folder assigned to a first user. Meanwhile, the first user share (and corresponding identification information) is stored in a memory of the first user. The access management system is configured to receive the first user share with an access request for a registered folder from the first user, recover the access key based on a number of shares satisfying the quorum and respective corresponding identification information, and deploy target data recovered using the recovered access key to the registered folder. According to such a configuration, a registered folder in which a user can flexibly update a data set can be set up on a shared data server and target data in the registered folder can be protected against corruption through making the data meaningless based on the user-specific key.

In the above-described embodiments, the registered folder is temporarily mounted onto the data server only during a period when the access key recovered in response to the access request exists as a substantial instance. In this case, the risk that the target data is read out by a malicious third person at a timing when a legitimate user does not notice it will be minimized even if the third person, having root authority for the data server, could know the location of the registered folder.

In the above-described embodiments, when replication of a user share is requested by the first user, a second user share is generated based on the first user share obtained from the memory owned by the first user and the system shares stored in one or multiple storage apparatuses. This means that the user share will not be unrightfully replicated by a malicious third person as the number of shares does not satisfy the quorum k without the first user's action and that the first user can newly create another user share only by means of providing the system with his or her user share. That is, the above-described technique has outstanding scalability to change in the number of users at the same time of realizing high data secrecy. Further, the second user share created according to the above-described technique is not a copy being identical with the first user share. Thus, even if those user shares are distributed to different users, it is easy to discern whether each key is used by its actual holder in data access.

In the above-described embodiments, the second user share is set to be a user share provided to a second user designated by the first user. According to such a configuration, when there exists a second user who is supposed to access data other than the first user who has initially kept the data in secret, the first user can give his or her intended second user authority to access the data through key replication. This procedure does not need involvement of a system administrator, which would be needed in a case of conventional access management technique. Therefore, no security risk arises due to corruption by a system administrator.

In the above-described embodiments, generation of a third user share based on the second user share and the system shares is only performed in a case where the second user has been given authority for key replication. According to such a configuration, even in a case where user shares are distributed to several users, it is possible to retain data access from the users under an appropriate control of the first user who has initially kept the data in secret or a user who has been legitimately given authority.

In the above-described embodiments, a user module configured to store a user share provided from the management module in a memory owned by a user is further provided. According to such a configuration, it is possible to securely distribute the user share from the management module to a user, which minimizes a risk of losing or leaking the user share.

In the above-described embodiments, a mapping between an index corresponding to each user share in polynomial interpolation and a legitimate user of each user share is managed and use of a user share by a user who has not been registered as a legitimate user in the mapping may be rejected. In this way, managing validity of user shares per index for share-based polynomial interpolation makes it easy to implement a mechanism such as ceasing usage of a user share that is exposed to a security risk and preventing a user share from being doubly created.

In a typical use case, the number of system shares i and the quorum k satisfy a condition of i=k−1. In this case, a single user can access data using a single valid user share of the user. However, the technology according to the present disclosure is not limited to the above-mentioned condition. In one application example, i=k−2 may be satisfied. In this application example, two user shares may be provided to an initial user (a so-called owner user) while one user share may be provided to each of the other users, for example. In this case, it is possible to realize gradual constraints on data utilization such that the owner user can access data by oneself (using two user shares of the user) whereas any other users cannot access the data unless two users come together.

In a typical use case, the access key may include a random bit sequence used in AONT transform or inverse AONT transform of the data to be kept in secret. In this case, if the access key is irrecoverable, the target data is also theoretically irrecoverable due to the nature of AONT scheme, allowing for protecting the target data against any security attack. AONT scheme modified to receive identical random bit sequences as inputs both for transform and inverse transform may be adopted. In a case where data that a user wants to access has already been AONT-transformed, the user can provide the system with his or her user share to cause the system to perform inverse AONT transform on the transformed data using a random bit sequence recovered based on the user share and the i system shares. In a case where the user updated the data recovered through inverse AONT transform, the system can keep the data in secret again by performing AONT transform on the updated data using the recovered random bit sequence in response to a data saving request from the user.

Irrespective of the above descriptions, the technology according to the present disclosure is not limited to keeping data in secret by AONT scheme. For example, a password for password authentication or a secret key in secret key cryptosystem may be utilized as the access key. It is possible to sustain or improve user's convenience at the same time as enhancing security also by means of splitting the password or the secret key using threshold secret sharing scheme with a number of shares n and a quorum k into n shares and setting i ($1 \leq i < k$) shares out of the n shares to be system shares and at least one remaining share to be a user share.

The preferred embodiments of the present disclosure have been described above with reference to the accompanying drawings, however, the technical scope of the present disclosure is not limited to the above examples. It is apparent that a person having ordinary skill in the art of the present disclosure may conceive various alterations and modifications within the scope of technical spirit described in the claims, and it will be appreciated that they will naturally come under the technical scope of the present disclosure.

The computer programs described in the present specification are stored in a non-transitory computer-readable medium provided inside or outside an apparatus. Each of those programs is, for example, loaded onto a RAM for execution and executed by a processor. The computer-readable medium may be any type of medium such as a read only memory (ROM), a compact disc (CD), a digital versatile disc (DVD), an HDD, an SSD, a magneto-optical disk, a magnetic disk, a magnetic tape, a cassette tape, a semiconductor memory, or a combination thereof, for example.

REFERENCE SIGNS LIST

1 Access Management System
5 Network
100 Access Management Server
122 Management Module
124 Configuration Management Sub-module
126 Threshold Secret Sharing Sub-module
132 User DB
134 Cabinet DB
150 Storage Server
200 User Terminal
210 Internal Memory (Secondary Storage Apparatus)
222 User Module
250 External Memory
R Access Key (Random Bit Sequence)
M Target Data
$K_1, \ldots, K_n$ Shares
$X_1, \ldots, X_n$ Split Data

The invention claimed is:

1. An access management system for managing access to data handled on a data server shared by a plurality of users comprising:
a management module configured to keep data in a registered folder on the data server in secret by transforming the data into a meaningless bit sequence using an access key;
at least one storage apparatus; and
a configuration management database;
wherein the management module is configured to, when a folder registration request for a first user is received:
register a data path of a folder assigned to the first user on the configuration management database;
generate an access key;
split the generated access key using threshold secret sharing scheme with a number of shares n and a quorum k into n shares;
store i ($1 \leq i < k$) shares out of the n shares in the at least one storage apparatus as system shares;

set at least one remaining share other than the system shares out of the n shares to be a first user share provided to the first user; and register identification information of the system share and identification information of the first user share on the configuration management database in association with the data path;

wherein the first user share and the identification information of the first user share are stored in a memory of the first user, wherein the management module is further configured to, when an access request for a registered folder from the first user is received:

recover the access key based on the first user share and the identification information of the first user share received with the access request, the identification information of the system shares registered in association with the identification information of the first user share in the configuration management database, and the system shares obtained from the at least one storage apparatus; and deploy target data recovered using the recovered access key to the registered folder specified by the data path registered on the configuration management database.

2. The access management system according to claim 1, wherein the management module is further configured to erase, after recovering the access key in response to the access request, the recovered access key when a notification of end of access is received, and the registered folder is temporarily mounted onto the data server only during a period when the access key exists.

3. The access management system according to claim 1, wherein the management module is further configured to transform the target data into a meaningless bit sequence using the access key in response to a saving request for the target data in the registered folder during a period when the access key exists.

4. The access management system according to claim 1, wherein the registered folder comprises a single data file, a set of multiple files, or a mixture of a file and a folder as the target data or is a vacant folder.

5. The access management system according to claim 1, wherein the identification information of the system share is an index of the system share, and the identification information of the first user share is an index of the first user share.

6. The access management system according to claim 5, wherein the management module is further configured to manage data indicative of whether a user share that has been set is valid or not per index for polynomial interpolation based on the shares.

7. The access management system according to claim 1, wherein the management module is further configured to, when a replication request for a user share from the first user is received, generate a second user share based on the first user share obtained from the memory of the first user and the system shares stored in the at least one storage apparatus, and set the generated second user share to be a user share provided to a second user designated by the first user.

8. The access management system according to claim 7, wherein the management module is further configured to generate a third user share based on the second user share and the system shares in response to a request from the second user only in a case where the second user has been given authority for key replication.

9. The access management system according to claim 1, wherein the number of system shares i and the quorum k satisfy i=k−1.

10. The access management system according to claim 1, wherein the management module is configured to transform the target data into a meaningless bit sequence using a random bit sequence per segmented data block, and the access key is the random bit sequence.

11. A method performed by a management module of an access management system for managing access to data handled on a data server shared by a plurality of users, wherein the management module is configured to keep data in a registered folder on the data server in secret by transforming the data into a meaningless bit sequence using an access key, the method comprising, when a folder registration request for a first user is received:

registering a data path of a folder assigned to the first user on a configuration management database;

generating an access key;

splitting the generated access key using threshold secret sharing scheme with a number of shares n and a quorum k into n shares;

storing i ($1 \leq i < k$) shares out of the n shares in at least one storage apparatus of the access management system as system shares;

set at least one remaining share other than the system shares out of the n shares to be a first user share provided to the first user; and registering identification information of the system share and identification information of the first user share on the configuration management database in association with the data path;

wherein the first user share and the identification information of the first user share are stored in a memory of the first user, the method further comprising, when an access request for a registered folder from the first user is received:

recovering the access key based on the first user share and the identification information of the first user share received with the access request, the identification information of the system shares registered in association with the identification information of the first user share in the configuration management database, and the system shares obtained from the at least one storage apparatus; and deploying target data recovered using the recovered access key to the registered folder specified by the data path registered on the configuration management database.

12. A computer program stored in a computer-readable storage medium for, when executed by a processor of an information processing apparatus, in an access management system for managing access to data handled on a data server shared by a plurality of users, causing the processor to function as a management module configured to keep data in a registered folder on the data server in secret by transforming the data into a meaningless bit sequence using an access key, wherein the management module is configured to, when a folder registration request for a first user is received:
  register a data path of a folder assigned to the first user on a configuration management database;
  generate an access key;
  split the generated access key using threshold secret sharing scheme with a number of shares n and a quorum k into n shares;
  store i ($1 \leq i < k$) shares out of the n shares in at least one storage apparatus of the access management system as system shares;
  set at least one remaining share other than the system shares out of the n shares to be a first user share provided to the first user; and
  register identification information of the system share and identification information of the first user share on the configuration management database in association with the data path;

wherein the first user share and the identification information of the first user share are stored in a memory of the first user, wherein the management module is further configured to, when an access request for a registered folder from the first user is received:
  recover the access key based on the first user share and the identification information of the first user share received with the access request, the identification information of the system shares registered in association with the identification information of the first user share in the configuration management database, and the system shares obtained from the at least one storage apparatus; and
  deploy target data recovered using the recovered access key to the registered folder specified by the data path registered on the configuration management database.

* * * * *